United States Patent
Vereen, III et al.

(10) Patent No.: US 10,052,247 B2
(45) Date of Patent: Aug. 21, 2018

(54) WHEELCHAIR WITH FOUR WHEEL INDEPENDENT SUSPENSION AND MODULAR SEATING

(71) Applicant: Dream Roller Mobility, LLC, Lakeway, TX (US)

(72) Inventors: Royal Leo Vereen, III, Bulverde, TX (US); Mark Kleber Nearburg, Lakeway, TX (US); Price Daniels Cobb, Austin, TX (US); Thomas Allan Mitchum, Lakeway, TX (US)

(73) Assignee: Dream Roller Mobility, LLC, Lakeway, TX (US)

( * ) Notice: Subject to any disclaimer, the term of this patent is extended or adjusted under 35 U.S.C. 154(b) by 0 days.

(21) Appl. No.: 15/244,647

(22) Filed: Aug. 23, 2016

(65) Prior Publication Data
US 2017/0056261 A1   Mar. 2, 2017

Related U.S. Application Data

(60) Provisional application No. 62/329,176, filed on Apr. 28, 2016, provisional application No. 62/208,875, filed on Aug. 24, 2015.

(51) Int. Cl.
*A61G 5/10* (2006.01)
*B60G 5/06* (2006.01)
(Continued)

(52) U.S. Cl.
CPC ............ *A61G 5/1078* (2016.11); *A61G 5/107* (2013.01); *A61G 5/1075* (2013.01);
(Continued)

(58) Field of Classification Search
CPC .... A61G 5/1056; A61G 5/107; A61G 5/1075; A61G 5/1078; A61G 5/1091; A61G 5/128; B60G 5/06; B60G 2200/13
(Continued)

(56) References Cited

U.S. PATENT DOCUMENTS

| | | | |
|---|---|---|---|
| 2,118,492 A | * | 5/1938 | Clark ........................ F04B 1/02 417/529 |
| 3,325,215 A | | 6/1967 | Murcott |

(Continued)

FOREIGN PATENT DOCUMENTS

| | | | | |
|---|---|---|---|---|
| EP | 0067069 A1 | | 12/1982 | |
| EP | 2997944 A1 | * | 3/2016 | ............. A61G 5/042 |

(Continued)

OTHER PUBLICATIONS

USA Techguide, "Invacare Orbit", "http://www.usatechguide.org/itemreview.php?itemid=839", May 14, 2015, Publisher: USA Techguide, Published in: US.

(Continued)

*Primary Examiner* — Joseph M Rocca
*Assistant Examiner* — Maurice L Williams
(74) *Attorney, Agent, or Firm* — Hunt Pennington Kumar & Dula, PLLC; Sanjeev Kumar

(57) ABSTRACT

This invention provides a wheelchair with four wheel independent suspension and modular seating, allowing for customized seat selection and a variable ride. It includes a chair assembly, a chassis assembly and a suspension assembly. The chair assembly includes a seat; a seat mount; a seat angle adjuster; and a pillar. The chassis assembly includes a chassis; and a handle assembly. The suspension assembly includes a forward suspension assembly and a rear suspension assembly. In another embodiment, the wheelchair includes a chair assembly with handles, a main cross beam and a suspension spring assembly.

13 Claims, 28 Drawing Sheets

(51) Int. Cl.
*A61G 5/12* (2006.01)
*A61G 7/10* (2006.01)

(52) U.S. Cl.
CPC .............. *A61G 5/1091* (2016.11); B60G 5/06
(2013.01); *A61G 5/128* (2016.11); *A61G 7/103*
(2013.01); *B60G 2200/13* (2013.01)

(58) Field of Classification Search
USPC .................................................. 280/124.128
See application file for complete search history.

(56) References Cited

U.S. PATENT DOCUMENTS

| | | | | |
|---|---|---|---|---|
| 3,653,455 A * | 4/1972 | Hetteen | ................ | B60F 3/0061 |
| | | | | 152/384 |
| 3,740,856 A * | 6/1973 | Culver | .................... | G01B 3/12 |
| | | | | 33/772 |
| 3,902,758 A | 9/1975 | Pivacek | | |
| 3,923,112 A * | 12/1975 | Goodgame | .............. | B60G 5/06 |
| | | | | 180/24.11 |
| 4,155,588 A * | 5/1979 | Danziger | ................. | A61G 5/00 |
| | | | | 297/115 |
| 4,602,800 A * | 7/1986 | Persson | ................. | B60G 17/04 |
| | | | | 180/209 |
| 4,619,578 A * | 10/1986 | Routledge | ................ | B60G 3/14 |
| | | | | 180/41 |
| 4,753,482 A | 6/1988 | Warren | | |
| 4,809,998 A * | 3/1989 | Girvin | .................... | A61G 5/08 |
| | | | | 280/250.1 |
| 4,920,734 A * | 5/1990 | Wenzel | .................. | A01D 34/69 |
| | | | | 56/11.1 |
| 5,044,650 A | 9/1991 | Eberle, Jr. | | |
| 5,112,076 A | 5/1992 | Wilson | | |
| 5,251,886 A | 10/1993 | Bursel | | |
| 5,772,237 A * | 6/1998 | Finch | ....................... | A61G 5/06 |
| | | | | 180/65.1 |
| 5,851,019 A | 12/1998 | Gill et al. | | |
| 6,341,657 B1 | 1/2002 | Hopely, Jr. et al. | | |
| 6,357,776 B1 | 3/2002 | Goertzen et al. | | |
| 6,814,411 B1 * | 11/2004 | Lin | ......................... | A61G 5/045 |
| | | | | 297/440.22 |
| 6,854,754 B1 * | 2/2005 | Easley, Jr. | ................. | A61G 5/10 |
| | | | | 188/2 F |
| 6,886,843 B1 | 5/2005 | Papac | | |
| 6,935,648 B2 * | 8/2005 | Beck | .................... | A61G 5/1059 |
| | | | | 280/250.1 |
| 6,994,364 B2 * | 2/2006 | Nelson | ..................... | A61G 5/00 |
| | | | | 280/250.1 |
| 7,007,965 B2 | 3/2006 | Bernatsky et al. | | |
| 7,438,145 B2 * | 10/2008 | Shin | ..................... | B60K 17/043 |
| | | | | 180/65.1 |
| 7,694,606 B1 | 4/2010 | Williams | | |
| 7,942,224 B2 * | 5/2011 | Marshall | ................ | B62K 5/01 |
| | | | | 180/273 |
| 8,011,680 B2 | 9/2011 | Chelgren | | |
| 8,297,388 B2 | 10/2012 | Lindenkamp et al. | | |
| 8,469,383 B2 | 6/2013 | Zhou et al. | | |
| 8,474,843 B2 * | 7/2013 | Mills | ..................... | A61G 5/045 |
| | | | | 280/124.128 |
| 8,540,038 B1 * | 9/2013 | Ullman | ................. | B60B 19/003 |
| | | | | 180/9.1 |
| 8,950,762 B2 * | 2/2015 | Song | ..................... | B60G 3/145 |
| | | | | 180/24.02 |
| 9,039,018 B1 * | 5/2015 | Lin | .......................... | B60G 3/12 |
| | | | | 280/124.129 |
| 9,073,585 B2 * | 7/2015 | Jackson | ................ | B62D 31/006 |
| 9,351,889 B2 * | 5/2016 | Mulhern | ................ | A61G 5/04 |
| 9,775,753 B2 * | 10/2017 | Johnson | ................ | A61G 3/063 |
| 2003/0230868 A1* | 12/2003 | Beumer | ................ | A61G 5/107 |
| | | | | 280/250.1 |
| 2004/0060748 A1* | 4/2004 | Molnar | ................ | A61G 5/043 |
| | | | | 180/65.1 |
| 2004/0075327 A1 | 4/2004 | Adams | | |
| 2004/0080138 A1* | 4/2004 | Kimura | ................ | A61G 5/1027 |
| | | | | 280/250.1 |
| 2004/0168839 A1* | 9/2004 | Wu | ........................ | A61G 5/043 |
| | | | | 180/65.1 |
| 2004/0262859 A1* | 12/2004 | Turturiello | ............. | A61G 5/042 |
| | | | | 280/5.515 |
| 2005/0077698 A1* | 4/2005 | Grymko | ................ | A61G 5/042 |
| | | | | 280/208 |
| 2005/0077715 A1* | 4/2005 | Mulhern | ................ | A61G 5/042 |
| | | | | 280/755 |
| 2005/0151360 A1* | 7/2005 | Bertrand | ................ | A61G 5/043 |
| | | | | 280/755 |
| 2005/0183900 A1* | 8/2005 | Goertzen | ............... | A61G 5/042 |
| | | | | 180/311 |
| 2005/0206149 A1* | 9/2005 | Mulhern | ................ | A61G 5/043 |
| | | | | 280/755 |
| 2005/0279540 A1 | 12/2005 | Wisner et al. | | |
| 2006/0087166 A1* | 4/2006 | Trippensee | ............. | A61G 5/043 |
| | | | | 297/338 |
| 2006/0201723 A1 | 9/2006 | Hsu et al. | | |
| 2007/0023209 A1* | 2/2007 | Wu | ........................ | A61G 5/043 |
| | | | | 180/65.1 |
| 2007/0107955 A1* | 5/2007 | Puskar-Pasewicz | ... | A61G 5/042 |
| | | | | 180/65.1 |
| 2008/0083573 A1* | 4/2008 | Tseng | ..................... | A61G 5/043 |
| | | | | 180/65.1 |
| 2009/0085324 A1* | 4/2009 | Blauch | ................. | A61G 5/1075 |
| | | | | 280/304.1 |
| 2009/0166996 A1* | 7/2009 | Spindle | ..................... | A61G 5/00 |
| | | | | 280/250.1 |
| 2009/0188728 A1* | 7/2009 | Osborne | ................. | B62D 1/02 |
| | | | | 180/6.24 |
| 2010/0004820 A1* | 1/2010 | Bekoscke | ............... | A61G 5/043 |
| | | | | 701/38 |
| 2010/0090380 A1* | 4/2010 | Hallamasek | ............. | A01H 5/12 |
| | | | | 267/136 |
| 2010/0126793 A1* | 5/2010 | Flowers | ................. | A61G 5/042 |
| | | | | 180/323 |
| 2010/0140898 A1* | 6/2010 | Purdue | .................. | A61G 5/023 |
| | | | | 280/250.1 |
| 2010/0320658 A1* | 12/2010 | Mueller | ................. | B60G 11/36 |
| | | | | 267/151 |
| 2011/0083913 A1* | 4/2011 | Cuson | ...................... | A61G 5/06 |
| | | | | 180/65.1 |
| 2012/0012416 A1* | 1/2012 | Mirzaie | ................. | A61G 5/043 |
| | | | | 180/291 |
| 2012/0138376 A1 | 6/2012 | Zhou et al. | | |
| 2013/0207364 A1* | 8/2013 | Bekoscke | ............... | A61G 5/045 |
| | | | | 280/124.104 |
| 2015/0014380 A1* | 1/2015 | Oyama | .................... | B62J 11/00 |
| | | | | 224/413 |
| 2015/0053490 A1* | 2/2015 | Santagata | ................ | A61G 5/06 |
| | | | | 180/65.1 |
| 2015/0107917 A1* | 4/2015 | Wu | ......................... | A61G 5/06 |
| | | | | 180/24.02 |
| 2015/0231002 A1* | 8/2015 | Gierse | .................. | A61G 5/1059 |
| | | | | 297/344.16 |
| 2015/0320633 A1* | 11/2015 | Jacobs | ..................... | A61H 3/04 |
| | | | | 297/6 |
| 2016/0051425 A1* | 2/2016 | Wu | ........................ | A61G 5/10 |
| | | | | 280/5.515 |
| 2016/0074263 A1* | 3/2016 | Wu | ......................... | A61G 5/06 |
| | | | | 180/24.02 |
| 2016/0101664 A1* | 4/2016 | Richter | ................ | B60G 99/002 |
| | | | | 701/49 |
| 2016/0101801 A1* | 4/2016 | Georgiev | ................ | B62B 9/00 |
| | | | | 180/22 |

FOREIGN PATENT DOCUMENTS

| | | | | |
|---|---|---|---|---|
| FR | 2965717 A1 * | 4/2012 | ............ | A61G 5/043 |
| GB | 2372696 A | 9/2002 | | |
| GB | 2488141 A * | 8/2012 | ............ | A61G 5/023 |
| WO | 2004037569 A1 | 5/2004 | | |

(56) References Cited

FOREIGN PATENT DOCUMENTS

OTHER PUBLICATIONS

Especial Needs, "Kid Kart Xpress Pediatric Wheelchair", "http://www.especialneeds.com/strollers-wheelchairs-ramps-strollers-pushchairs-stroller-sty . . . ", May 14, 2015, Publisher: eSpecial Needs, Published in: US.
dlf-data.org, "Minny Ultra-Lightweight Wheelchair", "http://www.dlf-data.org.uk/product.php?product_id=0038101&groupid=2766", May 14, 2015, Publisher: dlf-data.org, Published in: UK.
Spinlife, "Spinlife", "http://www.spinlife.com/images/alternate/223_3_13.jpg", May 14, 2015, Publisher: Spinlife, Published in: US.
ADI, "Variable Leve—User Interface", "http://adirides.com/disc-brake-systems/variable-lever/", May 14, 2015, Publisher: ADI, Published in: US.

* cited by examiner

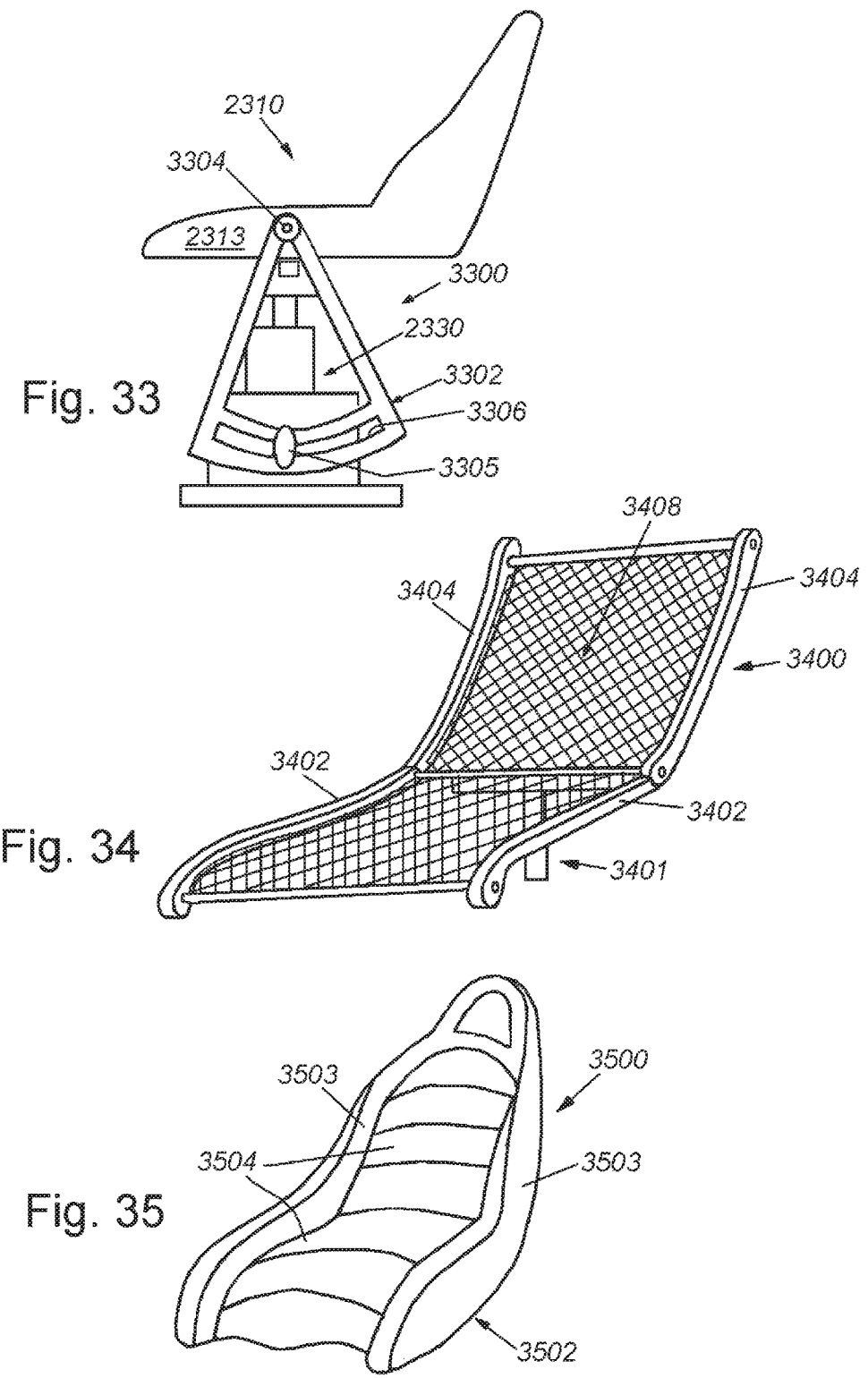

WHEELCHAIR WITH FOUR WHEEL INDEPENDENT SUSPENSION AND MODULAR SEATING

RELATED APPLICATIONS

This application claims the benefit of U.S. Provisional Application Ser. No. 62/208,875, filed Aug. 24, 2015, entitled WHEELCHAIR WITH FOUR WHEEL INDEPENDENT SUSPENSION AND MODULAR SEATING, and U.S. Provisional Application Ser. No. 62/329,176, filed Apr. 28, 2016, entitled WHEELCHAIR WITH FOUR WHEEL INDEPENDENT SUSPENSION AND MODULAR SEATING, the entire disclosure of which is herein incorporated by reference.

FIELD OF THE INVENTION

This invention relates to wheelchairs, and more particularly to a wheelchair having an independent suspension.

BACKGROUND OF THE INVENTION

Wheelchairs are an integral component in the lives of people who are temporarily or permanently disabled. In some cases, a wheelchair bound occupant is fully dependent on a caregiver. Commercially available wheelchairs provide a structure to hold an individual occupant for a short period of time, but are not comfortable for a significant amount of time on a daily basis. A typical commercially available wheelchair is a folding unit with a tubular steel frame and does not have any suspension system. The wheelchair is constructed with the seat area as an integral part of the chassis with attached wheels, footplates, handles and a back rest. The chassis is completely integrated into the chair, without consideration of dissipation of energy. The wheelchair does not have any shock absorbing or energy dispersing mechanisms, translating all of the energy from the frame to the occupant. A caregiver pushes the chair to furnish motive force, or it is self-propelled via appropriate motors and controls. With the chair being a stressed member of the chassis, every bump and jolt experienced by the chair moving across a surface is immediately and directly translated to the occupant as anxiety and discomfort. Furthermore, the placement of footrest and the size of the rear wheels can inhibit access to the occupant by the caregiver. This can make re-positioning the occupant more difficult.

A wheelchair is commonly used to transport an individual within a structure, to and from transportation and in the out of doors. Certain transportation vehicles can be adapted so as to contain the individual within the wheelchair inside the vehicle, so as to minimize movement from the chair to the vehicle and vice-versa. Movement within a building is generally across relatively level floors, with transitions between carpeted and bare floors, across thresholds and sometimes up one or more stairs. Movement outside buildings can be on a levelled surface or an uneven surface. Over time there has been an increase in development of trails in parks, thereby increasing access to previously inaccessible portions.

Movement for an individual can be anxiety-causing. Wheelchairs tend to be top-heavy and stability during any movement is a factor. Most of the energy absorbed by the frame is directly transferred through the seat to the individual. Some individuals have little to no control over their body orientation, while others may possess a strong muscular core in their torso, but have little to no control over their extremities. Others may have a strong core and limited use of extremities, such that they can re-position themselves within the chair. When an individual cannot adequately re-position themselves, they must rely on caregivers to do that for them. The inability to re-position themselves can cause a sense of panic when a wheelchair is violently jolted and the individual slides to and fro in their seat. Those who are able take it for granted to re-position their own body in a chair when a muscle is sore, a leg falls asleep or the chair unexpectedly threatens to spill the sitter to the floor. But this is not so for everyone, and when the ability to re-position is not present, there can be a lurking dread of falling or injury whenever the wheelchair is jostled. This fear can become a limiting factor in the enjoyment of life. An individual in a chair may become reluctant to travel into a park because the terrain of the trail is varied or rough. This could lead to an individual missing out on many pleasures. For example, an individual who is a car fanatic might be reluctant to travel to a place where off-road vehicles are competing in a hill climb because the trail is stony.

The comfort of a wheel chair relies in part on the seat, both for how well it holds the user and how well shock is dispersed before reaching the seat. However, the seat is typically an integral component that offers few if any options to the user with regard to comfort, ergonomics or general fit. Wheelchair accessories commercially available on the market include various supplemental seating cushions, pads and inserts. In many instances, the wheelchair bound individual is dependent for all daily activity on his or her wheelchair and the lack of variety in seating options is highly disadvantageous. Additionally, the fame and suspension system in most wheelchairs is relatively limited, and does not take advantages of advanced construction techniques and/or materials that are now commercially available and used in a wide range of contemporary manufactured products. It would be desirable to provide a system with interchangeable seats that can be adapted to the individual user that is mounted on a chassis that can displace shocks and energy and thereby create a smooth, enjoyable ride for the individual.

SUMMARY OF THE INVENTION

The present invention overcomes the disadvantages of the prior art by providing a wheelchair with an independent suspension and a modular seating arrangement that allows for ready customization of the seating element and/or suspension via a novel seat base structure. In an embodiment, the wheelchair includes a chair assembly; a chassis assembly; and a suspension assembly. The chair assembly includes a seat; a seat mount; a seat angle adjuster; and a pillar. The chassis assembly includes a chassis; and a handle assembly. The suspension assembly includes a forward suspension assembly; and a rear suspension assembly. In another embodiment, the wheelchair includes a chair assembly; a main structural cross beam; and a suspension spring assembly. In further embodiments, the suspension system can define a coil spring system, a gas traction shock system and a torsion spring system. In an embodiment, the wheelchair is comprised of a removable seat assembly; a mounting pillar; a chassis; a suspension assembly; and a plurality of wheels. The suspension assembly is an independent suspension system that includes a) two front suspension arms that are connected to an axle at one end and a front wheel at the other, b) two rear suspension arms that are connected to the axle at one end and a rear wheel at the other. Each of the suspension arms can be provided with a shock absorber.

BRIEF DESCRIPTION OF THE DRAWINGS

The invention description below refers to the accompanying drawings, of which:

FIG. 33 is a side view of a tilting mechanism for a wheelchair, according to an eighth embodiment;

FIG. 34 is a view of a mesh seat for a wheelchair, according to a ninth embodiment;

FIG. 35 is a view of a race car style seat for a wheelchair, according to a tenth embodiment;

DETAILED DESCRIPTION

I. Leaf Spring Suspension

Figure 1:
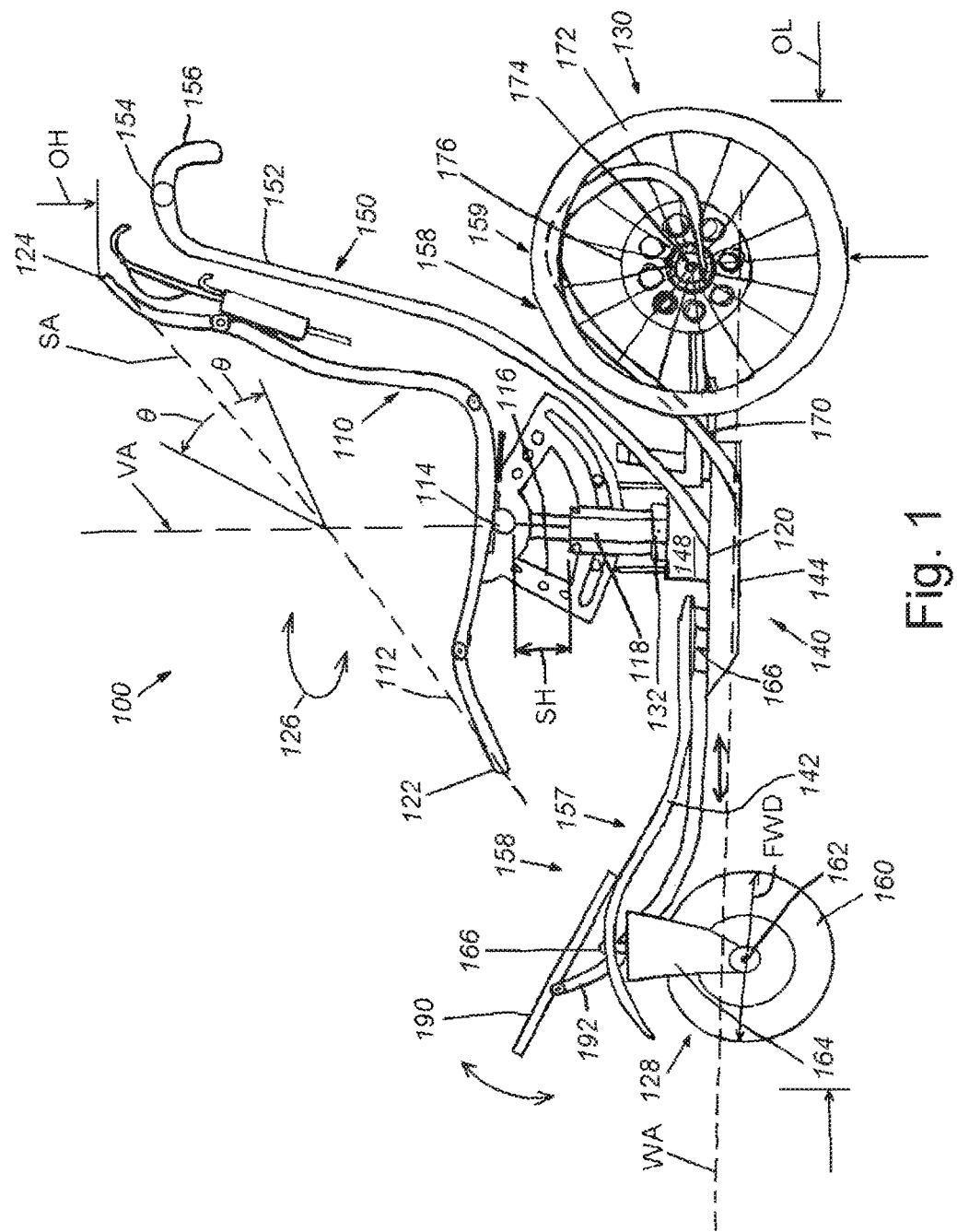
FIG. 1 is a side view of a wheelchair, according to a first embodiment.

An exemplary wheelchair 100 is depicted in FIG. 1. In an illustrative embodiment, wheelchair 100 is a mobility system that is comprised of three assemblies, a chair assembly 110, a chassis assembly 140 and a suspension assembly 158. The wheelchair 100 as shown is dimensioned according to the proportions of an average sized individual weighing between 50 and 250 pounds, and in other embodiments, it is contemplated that the size of the wheelchair system can be proportionately larger or smaller, depending on the size of the user (for example, smaller in the case of a child and larger for a big or tall adult). In an embodiment, a wheelchair 100 has an overall length OL of approximately 32 inches (81 cm) and an overall height OH of approximately 42 inches (107 cm). The chair assembly 110 is comprised of a seat 112, a seat mount 114, a seat angle adjuster 116 and a hydraulic cylinder 118 that is a pillar that connects the seat 112 at its upper end to the frame 120 at its lower end. The seat 112 is a molded contoured structure that can be provided with an upholstered cover for comfort and additional support. The seat can also be computer modeled to adapt to the particular physical contours of the occupant. In a further embodiment, it is contemplated that the seat can be provided with internal heating coils for warmth. The composition of the seat 112 is a rigid polymer and can be formed of natural or synthetic materials. The seat can be readily removed from the pillar and is interchangeable with other chairs that have been fitted with an adapter for a mounting mechanism. Given that the wheelchair can have a use life of more than twenty years, replacement of the seat for use or to change activities is relatively easy provided that the replacement has the adapter in place.

Seat angle adjuster 116 allows for adjustment of the seat relative to a vertical axis VA drawn upward from the hydraulic cylinder 118. A seat axis SA is defined as a line drawn from the forward leading edge 122 of the seat 112 to the opposite rear end 124 of the seat. The seat adjuster 116 is a locking device that is manually operated by a lever that can be actuated to allow for a forward or rearward motion of the seat 112. The seat angle adjuster is mounted on top of the hydraulic cylinder 118 and when unlocked allows a forward and rearward motion of up to 15° (fifteen degrees) in an angular range θ of the seat angle SA relative to the vertical angle VA. This range of motion can be selected by the user or the user's caregiver. The seat is rotatable in a range of motion 126 of 90° (ninety degrees) to the right or left of an axis WA drawn from the front end 128 of the wheelchair 100 to the rear end 130. This corresponds to a swivel action in a range of motion of 180° (one hundred and eighty degrees) from left to right, and back. It is contemplated that the orientation of the chair 110 relative to axis WA can be maintained by locking the swivel action with a locking device, for example, a locking lever or detent button.

In various embodiments, the chair assembly 110 can be elevated or lowered by operation of a hydraulic cylinder 118. The hydraulic cylinder 118 can be actuated by a foot pump 132 that causes the cylinder 118 to raise and lower the seat height SH. The cylinder has a range of motion of 5 inches (13 cm). The foot pump 132 enables the caregiver to select the correct height for lifting and moving the user for ease of ingress and egress and caregiver safety. The caregiver can match the height of the seat to other objects, for example, tables, chairs and beds. The elevation and lowering of the chair assembly 110 provides comfort for both the user and caregiver.

The chassis assembly 140 can be connected to the forward spring arm 142 that connects a chassis 144 with a pair of forward wheels 128 and provides shock absorption. The chassis assembly 140 includes the chassis 144 and a handle assembly 150. A rear spring arm 170 connects the chassis 140 with the rear wheels 130. A base 148 can be mounted on the top of the chassis 144 and serves as a supporting base for the hydraulic cylinder 118. The handle assembly 150 can be attached to the chassis assembly 140 at the chassis 144. The handle assembly 150 has two vertically mounted handle arms 152, a crossbar handle 154 and a second set of gripping handles 156. The crossbar handle 154 is a horizontally oriented bar that extends from one handle arm 152 to the other. The handle arms 152 are mounted directly to the chassis 144 to further isolate the chair assembly 110 and provide a smoother ride for the user. The handle arms 152 and gripping handles 156 can be extended to the rear to give the caretaker more leverage for maneuvering the chair. A locking device (not shown) can be fixed to the handle arms 152 to allow locking the chair assembly 110 to the handle arms 152 for added security in rough or uneven terrain. When unlocked, the chair assembly 110 can rock back and forth and swivel up to 180° (one hundred and eighty degrees), unimpeded by the handle arms 152. The gripping handles 156 curve downwards. The arrangement of the crossbar handle 154 and the gripping handles 156 decreases fatigue in the hands, wrists and forearms of the caregiver, as well as providing better leverage options for greater control over the chair, and safety in variable situations. The handle arms 152 as depicted are formed of steel tubes. In other embodiments, the arms 152 can be solid and/or formed of rigid polymers or lighter metals.

The forward wheel assemblies 159 are located at the front end 128 of the chassis assembly 140 and are attached to the chassis assembly via the forward suspension arms 142. The forward suspension arms 142 are springs. There is a forward wheel assembly 159 on each of the right and left sides of the wheelchair 100. The forward wheel assemblies 159 are suspension features that have wheels cantilevered on the ends of springs. Each forward wheel assembly 159 describes a caster mechanism and is provided with a wheel 160; an axle 162; a set of forks 164 and a swivel mount 166 that is connected to the forward spring arm 142. The wheel 160 is mounted to the forks 164 at the axle 162 and is in turn connected to the suspension arm 142 at the swivel mount 166 that is seated on top of the forks 164. Each suspension arm 142 can be connected to the chassis 140 at a mounting point 165. The suspension arm 142 functions as a spring for greater comfort to the user and caregiver. The swivel mount 166 allows the wheel to rotate freely for quick turning and pivoting. The front wheel diameter FWD is approximately 8 inches (eight inches). In an embodiment, each front wheel 161 is filled with foam under pressure for a softer ride and puncture protection. In other embodiments, the wheels can be hard, pneumatic and filled with air or another gas and dimensioned larger or smaller. More generally, the size of the wheels and/or the structure and material of tire and hub construction are highly variable in a manner clear to those of skill. The hubs can be solid, spoked, wire, or a combination of such. The tires can be any acceptable thickness suitable for the terrain being traversed. According to various embodiments, the wheels can be interchangeable and wheel sets can be provided for various applications (e.g. indoor versus outdoor travel).

The rear suspension assemblies 158 are suspension features that have wheels cantilevered on the ends of springs. The suspension assembly 158 includes a rear spring arm 170 that is curved and describes a portion of an Euler spiral. The spring arm 170 connects with a rear wheel 172 at an axle 174. The rear wheel can be filled with foam under pressure for a softer ride and puncture protection. In an embodiment, a disk brake 176 is mounted with the rear wheel 172. The illustrative disk brake 176 is actuated by a hand control (not shown) that causes brake pads to come in contact with the disk brake 176. The hand controls include a locking mechanism to act as static full time wheel locks when the wheelchair needs to be locked in place.

A footrest 190 is transversely mounted to a pair of footrest support arms 192 that are mounted to the chassis assembly 140. The footrest support arms 192 curve upward. The support arms 192 are telescoping, and can be extended or retracted without removing them from the chassis. This enables the caregiver to have more secure and safe access to the user during user ingress and egress from the chair. The footrest 190 can be mounted so it swivels for further comfort and adjustment.

Figure 2:
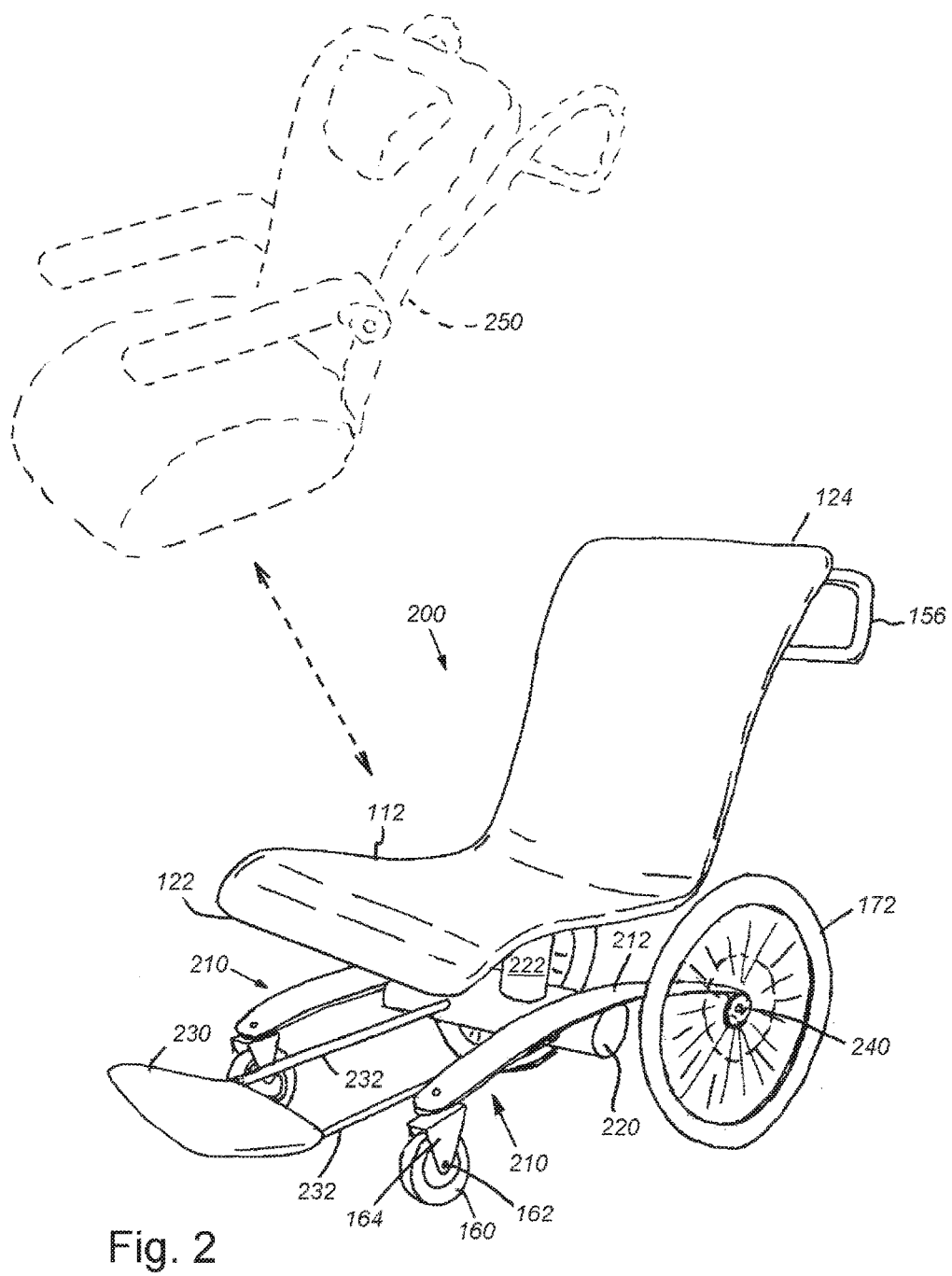
FIG. 2 is a frontal perspective view of a wheelchair, according to a second embodiment.

FIG. 2 depicts an illustrative wheelchair 200 in a second embodiment. The wheelchair 200 includes a spring suspension assembly 210 that functions as a spring. The seat 112 is the seat of FIG. 1. The front wheel assembly and rear wheel are also the same as in FIG. 1. The spring 212 differs from FIG. 1, wherein the rear spring arm 170 was shaped to describe an Euler spiral in part. In FIG. 2, the same spring 212 is connected to both front and rear wheels. The spring 212 is a suspension member that includes various spring arrangements that are clear to those of ordinary skill. The material of the spring can be steel, carbon fiber, polymer-based, a composite or another like material. The spring can have a cross-section profile that describes a triangle, square, a hexagon, or another polygonal shape. Main cross member 220 is a transverse mounted cylinder that supports the spring suspension assemblies 210. A vertical pillar 222 is connected to the main cross member 220 and supports the seat 112. The pillar can be adjusted to different heights as set forth above. The main cross member and pillar are depicted as being circular in shape with regard to their cross-section profile. In another embodiment, the main cross member and pillar can have a cross-section profile that describes a square, a hexagon, or another polygonal shape. The material used to form the main cross member and pillar can be wood, a polymer, a metal (for example, aluminum, steel, titanium or a composite), a carbon fiber structure or composite material that is rigid, light, strong and compliant to shock. Footrest 230 is connected to the chassis 220 by a pair of footrest support arms 232. In an embodiment, the footrest can swivel and is extendible in the telescoping manner of the footrest in FIG. 1. A pair of rear axles 240 connects their respective rear wheel 172 to spring 212.

The main cross member 220 determines the center of gravity depending on where it is located along the suspension spring path (the path describes a segment along the length of the spring). It is expressly contemplated that the main cross member can be adjustably positioned with regard to the spring suspension assemblies 210 and that it can be unlocked, repositioned and re-locked into place in response to various terrain features and user comfort desires. This repositioning can increase or reduce the responsiveness in the spring suspension, resulting in a more cushioned or stiffer ride. Moving the main cross member forward or back redistributes the center of gravity (the point at which the entire weight of a body can be considered as concentrated so that if supported at this point the body would remain in equilibrium in any position). As shown in the embodiment of FIG. 2, the spring tension to the rear of the main cross member is stiffer, while the spring that is forward of the main cross member is more flexible, allowing the wheelchair to absorb shocks and jolts from uneven terrain. The main cross member is the main structural component to mount the suspension springs and no other support is needed for the framework. This allows greater front and rear access for the caregiver than conventional wheelchairs.

The vertical pillar 222 (seat base) is the mount for the seat 112 and is attached to the center of the main cross member 220. This is the only contact point and structural relationship between the seat and suspension chassis. The suspension chassis is comprised of the spring suspension assemblies, the main cross member 220, and the wheels. This arrangement enables each wheel to act independently of the other, resulting in a four wheel independent suspension. This isolation of the consumer/user contributes to the elimination of harsh jolts and movement due to terrain. The chair in this embodiment can be swiveled back and forth as the chair shown in FIG. 1. It also provides for different chairs to be exchanged as consumer needs and tastes change over time. It is contemplated that seats with different padding, appearance and features can be interchanged using a common mounting and locking device (not shown) at the top of pillar 222. Separating the chair from the suspension chassis can result in greater comfort for the consumer/user. The gripping handles 156 can be adapted to different chairs and can be extended to the rear to give the caretaker more leverage for maneuvering the chair. A seat can be custom ordered and applied by the manufacturer—such seat can be a commercially available seat design (for example, a conventional desk chair (e.g. the well-know Aeron® chair line or an automotive seat (e.g. the well-known Recaro® seat system)), or can be a custom-built seat that is adapted particularly to the user's body/needs—as such the seat can include various add-ons, such as arm/head/neck rests, controls, and the like. A plurality of seats can be provided to the user/consumer—suitable for various situations/activities (e.g. an indoor seat and an outdoor seat). To exchange a particular seat, the user/consumer (or appropriate caregiver) detaches the seat 112 from the base and attaches a new seat 250 to the base. Any electronic/pneumatic controls provided on the seat can be connected via appropriate leads and plug connectors routed through or on the base.

The main cross member design allows a chassis to be designed for the weight and ride characteristics most suitable for the terrain, conditions and overall ride comfort required by the consumer and caregiver. This enables confidence and relaxation for the consumer and caregiver, providing a smoother ride and a more stable and safe environment. A smoother ride for the consumer results in an easier effort by the caregiver, who is providing motive force for the chair and its occupant. This can be related to how individuals perceive the ride of a car and whether it is "firm" or "soft".

The suspension springs can be constructed of the same materials as the main cross member, or another material, dependent on spring properties, weight ratios, and terrain required by the consumer and caregiver. Likewise, the spring length, cross section design, and width can be changed, depending on spring properties, weight ratios, and terrain required by the consumer. This provides for modification of the suspension chassis to meet the physical requirements of a greater number of consumers and a wider range of terrain conditions and features. Changes in the consumer's physical needs over time can be met by modifications to the suspension chassis and positioning of the main cross member, aiding in the maneuverability of the chair. Such changes can also be made to optimize the maneuverability of the chair by caregivers of different sizes and strengths. The spring assemblies allow for the four wheels to interact with the terrain independently. Independent suspension reaction isolates the chair from sharp shocks and jolts, and enhances the consumers' comfort and safety. The independent suspension reaction also allows the consumer and caregiver greater control and access over a wider range of terrain. When the caregiver has to negotiate a step or a curb, and must raise the front wheels off the ground, the spring facilitates a more consistent lever action, minimizing the consumer's feeling of being about to tip over and giving the caregiver greater confidence in negotiating the step or curb without incident. The spring suspension absorbs shock, reducing the jolt experienced when placing the front wheels back down after passing over a step or curb, alleviating the consumer's dread of feeling like they are about to be ejected from the seat. The spring suspension also allows the caregiver more control when pulling the chair backwards over a tall obstacle by softening and increasing the apex of the rear wheels. The spring suspension provides for an easier and more comfortable negotiation of smaller obstacles, for example, uneven sidewalk panels or uneven ground.

Figure 3:
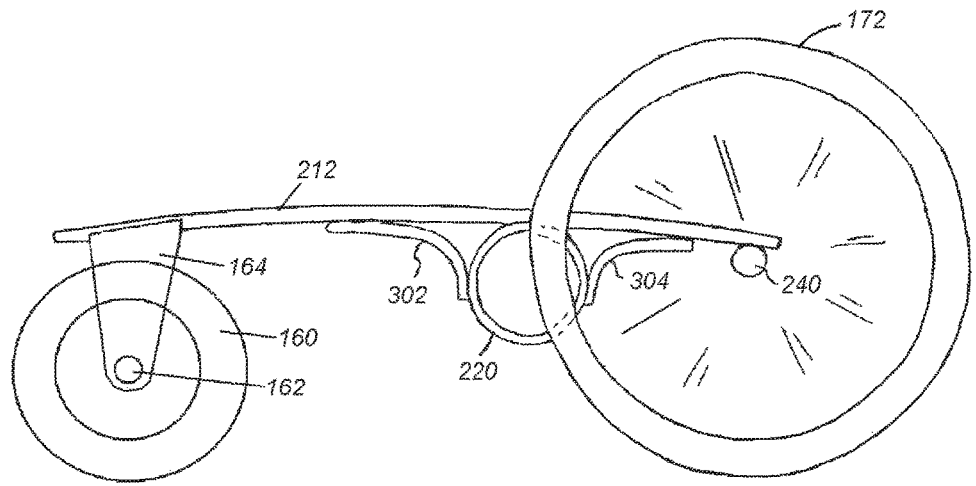
FIG. 3 is a schematic side view, according to the second embodiment.

It is contemplated that the action of the spring assemblies can be moderated by a suspension spring tensioner, as shown in FIG. 3. The illustrative spring tensioner 302, 304 is a device that can be mounted on either spring, or mounted on both springs. The spring tensioner is a device for adjusting the tension of the springs, allowing a fine tuning of the spring tension and providing greater structural support. This provides for a custom spring rate for the different weight ratios of consumers, as well as allowing more flexibility for terrain changes. When the location of the main cross member in relation to the suspension spring assemblies is established, the spring tension can be fine tuned using the spring tensioner device. The forward spring tensioner 302 is mounted with one end on the spring and the other on the main cross member, on the forward edge. The rearward spring tensioner 304 is located with one end on the spring and the other end on the main cross member, on the rearward edge. The facility to match a consumer's environment to the desired ride feel for the consumer and caregiver is accomplished using the spring tensioner by varying the distance between the attachment points on the main cross member to the attachment points on the suspension springs. The spring tension is adapted to accommodate variable terrain conditions. When such are anticipated, for example, over obstacles or broken ground, the suspension spring tensioner can be lengthened in the rear to cause the spring to become stiffer in response and shortened in the front to alleviate sharp shocks and jolts to the chair. A more responsive rear spring can assist the caregiver in raising the front end by pushing downward on the handles. Alternatively, if the wheelchair is to be employed in a nursing home or hospice environment for long periods of time, residing and/or traversing primarily smooth and even floor surfaces, then the suspension spring tensioner can be shortened to allow the suspension spring to deliver a soft feel to the user's ride. In such instances, the spring tensioner serves to reinforce the structure. It is contemplated that the spring tensioners can be provided as part of a kit with the wheelchair from the manufacturer or distributor (or from an after-market supplier), and can optionally include pairs of spring tensioners of differing sizes and/or strengths.

Figure 4:
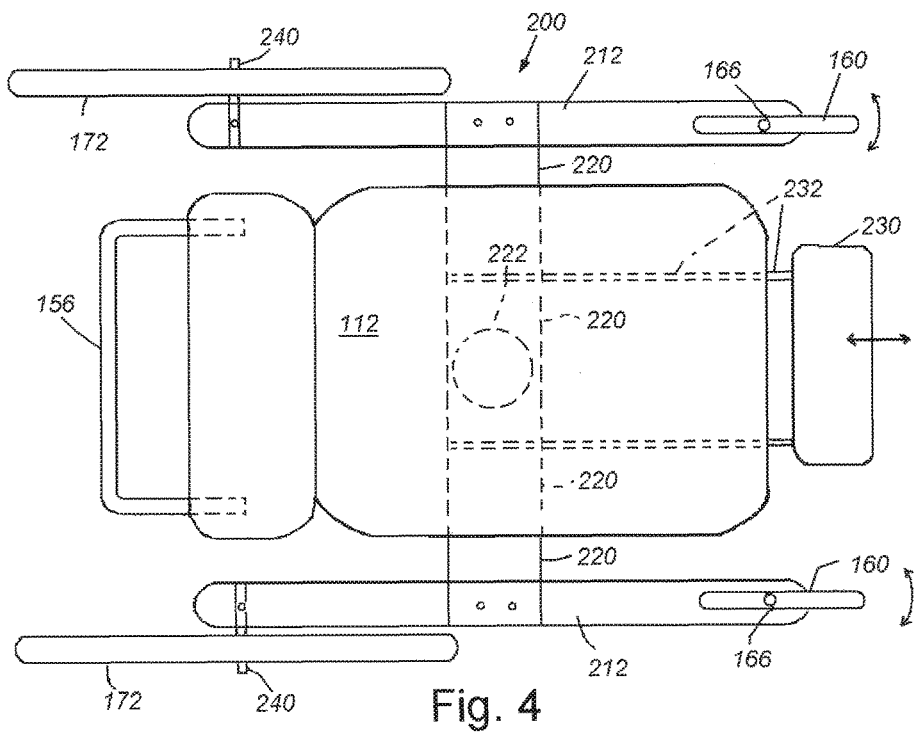
FIG. 4 is a top view of a wheelchair, according to the second embodiment.

FIG. 4 is a top view of the wheelchair of FIG. 2. The rear wheels 172 are shown as connected to the respective springs 212 at axles 240 so that the wheels are outside of the respective springs. The swivel mount 166 allow for free rotation of the front wheels 160 relative to the springs 212.

Figure 5:
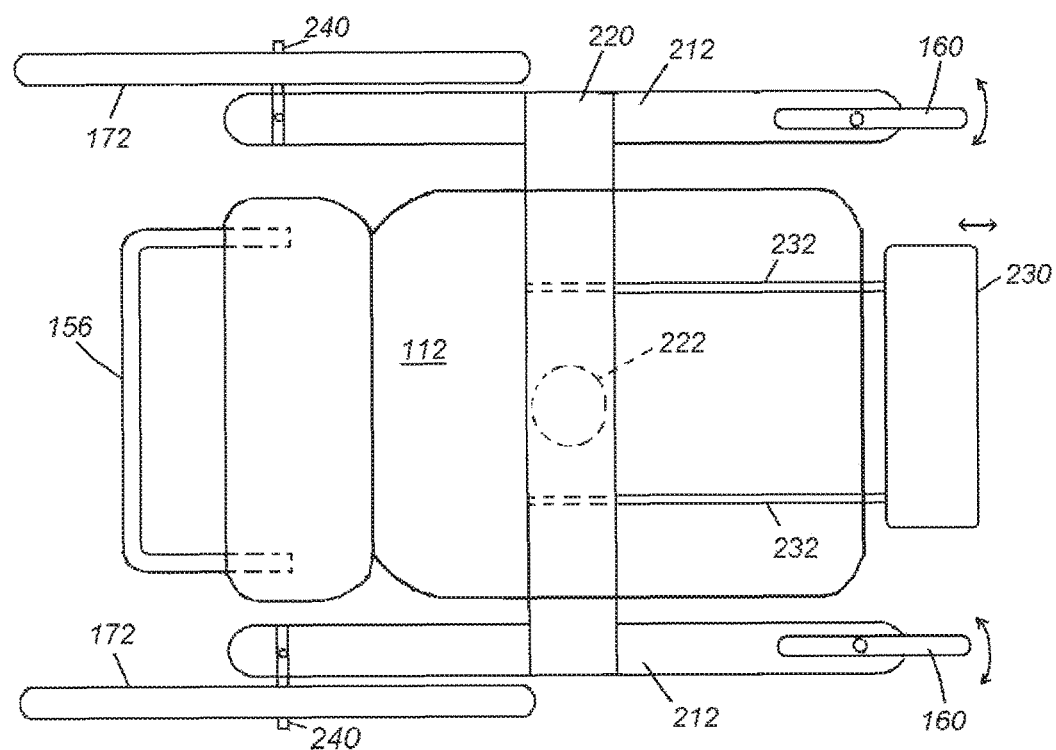
FIG. 5 is a bottom view of a wheelchair, according to the second embodiment.

FIG. 5 is a bottom view of the wheelchair of FIG. 2. The handles 156 extend into the seat 112 and are locking. The support arms 232 extend into the footrest 230. As noted above, the seat can be removed and exchanged for a seat with a different shape, for example, a seat having arm rests, a lap belt or other restraints.

It should be clear that the embodiments of the wheelchair described above provide a personal mobility platform that performs with greater cushioning and versatility of suspension. The variability of angular orientation for the chair in the first embodiment provides for greater comfort of the consumer. The adjustability of the spring tension facilitates greater versatility in movement of the chair over various terrains and obstacles. The locking handle promotes easier movement and control over the chair. The independent nature of the chair and chassis/suspension provides enhanced ergonomic and economic benefits and increased design flexibility.

II. Coil Spring Suspension

Figure 6:
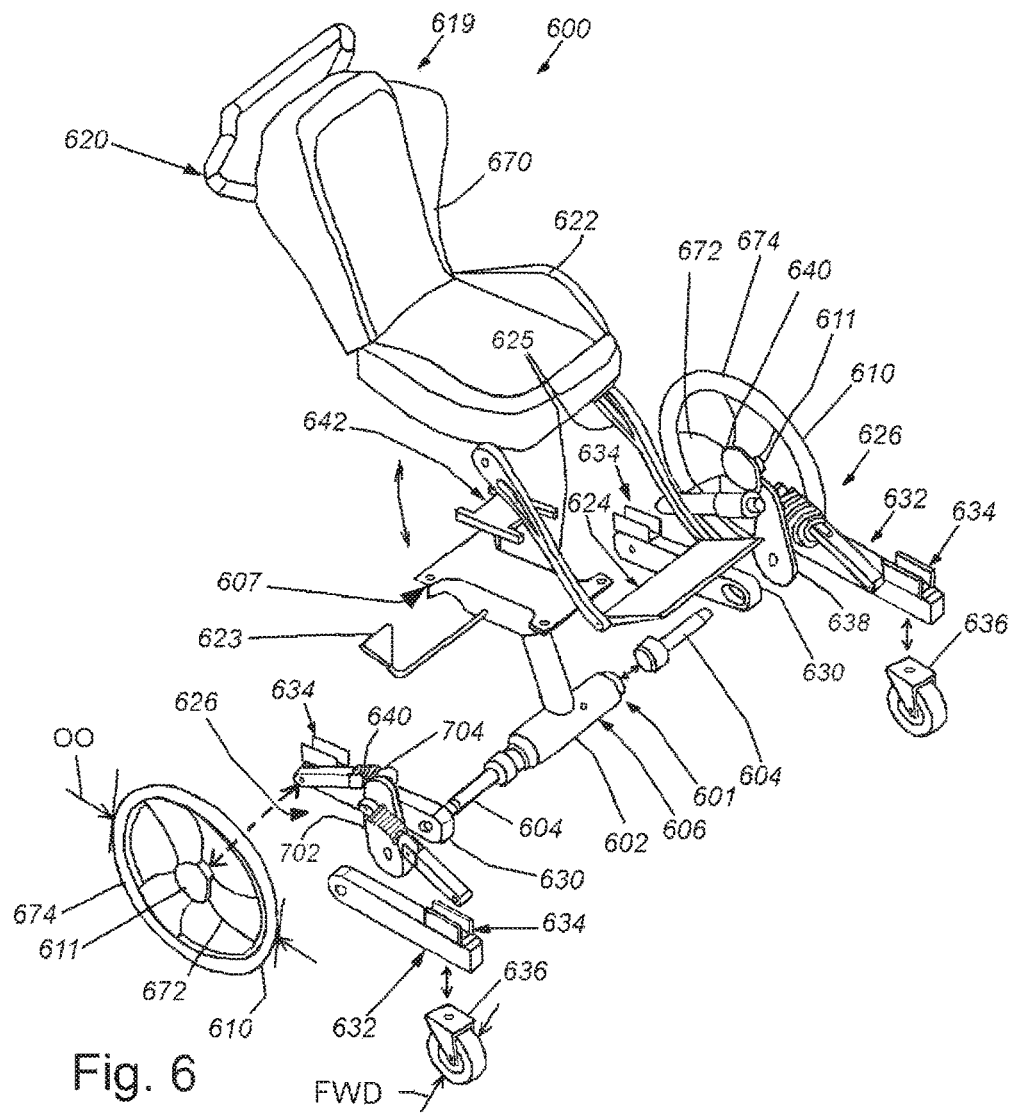
FIG. 6 is an exploded perspective view of a wheelchair, according to a third embodiment.

A wheelchair 600 with a suspension that utilizes coil springs to dissipate and/or absorb energy during movement is shown in an exploded view in FIG. 6, according to an illustrative embodiment. The wheel chair 600 describes a mobility system that is comprised of three assemblies; a chassis assembly 601 describes an inverted T-shape and is comprised of a center tube 602, a pair of counter-posed spindles 604, a T-post 606 and a seat bracket 607. The wheelchair 600 includes a pair of rear wheels 610 that are each attached at a hub 611 to the rear portion of a suspension assembly 626. A chair assembly 619 is mounted on top of the chassis assembly 601 and is comprised of a set of handlebars 620 that are attached to a seat 622 that is mounted on top of the seat bracket 607. The seat 622 is a molded contoured structure that can be provided with an upholstered cover for comfort and additional support. The seat 622 can also be customized for a particular user using computer modeling to adapt to the particular physical contours of the occupant. The wheelchair as shown is dimensioned according to the proportions of an average sized adult, and in other embodiments, it is contemplated that the size of the wheelchair system can be proportionately larger or smaller, depending on the size of the user (for example, smaller in the case of a child and larger for an overweight or very tall adult). In a further embodiment, it is contemplated that the seat 622 can be provided with internal heating coils for warmth. The structural composition of the seat 622 is a rigid polymer and can be formed of natural or synthetic materials. The seat 622 can be readily removed from the seat bracket 607 and can be replaced or exchanged for a different seat or chair. The traditional wheelchair uses the seat as a stressed piece of the frame, severely limiting ergonomic and safety options. The wheelchair as shown separates the functions and relationship of the seat and frame of the traditional wheelchair by removing the seat or chair as a stressed piece of the frame. A footrest 624 is attached to the seat 622 by a set of footrest support arms 625. A suspension assembly 626 is mounted to the wheelchair 600 at each spindle 604 and each suspension assembly 626 includes a rear arm assembly 630, a front arm assembly 632, a connection channel 634, a caster wheel 636, a shock tower 638, a shock assembly 640 and a rear wheel 610. A center of gravity adjuster 642 is located between the chair 622 and the top of the seat bracket 607.

With regard to center tube 602, it is the main and central support structure for the chassis. The center tube 602 is hollow to save weight and provide an area for the shoulder of the spindles 604 to insert and attach to the center tube 602. The center tube 603 can be constructed of aluminum, steel, carbon fiber, polymer-based, a composite or another like material. The spindles 604, T-Post 606 and shock towers 638 are attached to the center tube 602. The integration of these components in this arrangement allows energy and forces acting on the chassis to be dissipated through the interaction of these components, isolating these forces from the chair, user, and caregiver. The center tube 602 and attached components together define a main cross member that allows a chassis to be designed for the weight and ride characteristics most suitable for the terrain, conditions and overall ride comfort required by the consumer and caregiver. This enables confidence and relaxation for the consumer and caregiver, providing a smoother ride and a more stable and safe environment. A smoother ride for the occupant results in an easier effort by the caregiver, who is providing motive force for the chair and its occupant. This can be related to how individuals perceive the ride of a car and whether it is "firm" or "soft". The spindles 604 attach to the center tube 602 at a shoulder that inserts into the outer end of the center tube 602 and is locked by a bolt to prevent rotation. The spindles 604 can be constructed of aluminum, steel, carbon fiber, polymer-based materials, a composite or another like material. The spindles 604 support the rear arm assembly 630, the front arm assembly 632, the shock tower 638, the chassis assembly 601 and the chair assembly 619.

The T-Post 606 isolates the chair from the chassis and suspension elements. This is the only contact point and structural relationship between the seat 622 and the chassis assembly 601 and suspension assembly 626. The T-Post 606 is rotatable with respect to the center tube 602 and can lock at various positions by means of a pin to change the entire chair angle orientation. This range of motion can be selected by the occupant or the occupant's caregiver. This allows an occupant the ability to change pressure points on their body during long term use, to change the angle of repose depending on social situations, and, to provide medical benefits relating to edema common in long term use of traditional wheelchairs. In another embodiment, the T-Post 606 is constructed with a foot lever for the caregiver to exert leverage on the chassis. The material of the T-Post 606 can be aluminum, steel, carbon fiber, polymer-based, a composite or another like material.

Each of the rear wheels 610 attaches to a rear arm assembly 630 via a sealed roller bearing and axle. The outer diameter OD of a rear wheel 610 is approximately 14" to 16" (35.5 cm-40.6 cm) (±1"). In other embodiments, the outer diameter OD can be greater or lesser. The wheelchair 600 as shown uses a significantly smaller diameter rear wheel 610 than a traditional wheelchair for the following reasons. First, the occupant for this wheelchair depends solely on a caregiver for motion due to the occupant's loss or reduction of arm and hand muscle coordination and/or functionality. Larger diameter wheels can interfere with caregiver direct access to the occupant of the chair. The "Occupant" is herein defined as the passenger of the wheelchair that is occupying the seat 622. The "Caregiver" is defined as an attendant to the occupant and the provider of motive force for the wheelchair and its occupant. The rear wheels 610 of the illustrative wheelchair are of a medium size relative to other wheelchairs and this sizing provides complete access for the caregiver from all degrees of angular orientation relative to the occupant, particularly from the sides. In an embodiment, the wheelchair 600 is not collapsible sideways, as with traditional wheelchairs. The illustrative wheelchair 600 collapses by folding the seat back 670 onto the seat 622. The rear wheels 610 are of a medium size and smaller than traditional wheelchairs, so the profile of the illustrative wheelchair is relatively lower when collapsed than a traditional wheelchair, providing for a more compact profile during transportation. The chair can be removed for a smaller profile during transportation. It is contemplated that a removable vehicle seat can be retro-fitted to mount on top of the chassis, so that it can be removed from the vehicle and placed onto the chassis. The rear wheels 610 comprise a spoke structure 672, hubs 611 and tires 674. The rear wheels 610 and tires 674 can be of any material depending on uses required by the occupant or caregiver. In an embodiment, each rear wheel 610 is filled with foam under pressure for a softer ride and puncture protection. In other embodiments, the rear wheels 610 can be hard, pneumatic and filled with air or another gas and dimensioned larger or smaller. More generally, the size of the wheels and/or the structure and material of tire and hub construction are highly variable in a manner clear to those of skill. The hubs 611 and spoke structures 672 can be solid, spoked, wire, or a combination of such. The tires 674 can be any acceptable thickness suitable for the terrain being traversed. According to various embodiments, the rear wheels 610 can be interchangeable and wheel sets can be provided for various applications (e.g. indoor versus outdoor travel).

Handlebars 620 can be adjusted for multiple orientations of height, length and angles to provide multiple locations and angles for the caregiver to grip, propel and maneuver the wheelchair 600. The handlebars 620 provide multiple positions to mount bicycle type levers for a rear disc brake system (not shown), controlled with either one or two levers (two to control the right and left rear independently). Proper leverage is a must for caregiver safety, efficiency, and comfort. The caregiver can desire proper and comfortable hand and wrist angles for effective maneuvering and to protect that caregiver from potential hand and wrist injuries. The handlebar 620 describes a crossbar handle and the gripping handle reduces fatigue in the hands, wrists and forearms of the caregiver, as well as providing better leverage options for greater control over the chair, and safety in variable situations. The handlebar 620 as depicted are formed of steel tubes. In other embodiments, the arms can be solid and/or formed of rigid polymers or lighter metals. This handlebar 620 may be locked in place in any position moving forward or backward to facilitate caregiver needs.

The chair assembly 619 is rotatable in a range of motion of 90° (ninety degrees) to the right of left of an axis drawn from the front end of the wheelchair to the rear end. This corresponds to a swivel action in a range of motion of 180° (one hundred and eighty degrees) from left to right, and back. It is contemplated that the orientation of the chair relative to axis can be maintained by locking the swivel action with a locking device, for example, a locking lever or detent button with stops at 45 degree increments. As previously stated, a unique feature of the wheelchair 600 as shown is modular nature of the design, separating the chair assembly 619 from the chassis assembly 601. The wheelchair 600 is composed of modules that can be interchanged to serve the needs of the occupant. Different seats 622 can be exchanged as consumer desires and tastes change over time. It is contemplated that a plurality of seats 622 with different padding, appearance and features can be interchanged using a common mounting. A handle 623 is a controlled locking device for the center of gravity adjuster the T-post 606. Handlebars 620 can be adapted to different chairs and can be extended to the rear to give the caretaker more leverage for maneuvering the chair. A seat 622 can be custom ordered and applied by the manufacturer—such seat can be a commercially available seat design (for example, a conventional desk chair (e.g. the well-known Aeron® chair line or an automotive seat (e.g. the well-known Recaro® seat system)), or can be a custom-built seat that is adapted particularly to the occupant's body/needs—as such the seat can include various add-ons, such as arm/head/neck rests, controls, and the like. A plurality of seats can be provided to the occupant/consumer—each suitable for various situations/activities (e.g. an indoor seat and an outdoor seat). To exchange a particular chair assembly 619, the occupant/consumer (or appropriate caregiver) detaches the Chair from the T-post 606 and attaches a new seat to the T-post 606. Any electronic/pneumatic controls provided on the seat can be connected via appropriate leads and plug connectors routed through or on the chassis assembly 619, T-post 616, and seat 622.

The footrest 624 is attached to chair assembly 619 by the footrest support arms 625. The attachment point allows the footrest 624 to swivel and change angles in coordination with the movement of the wheelchair 600. The footrest 624 is integrated with the design and is not detached during ingress and egress of the occupant. This eliminates frustration and time by the caretaker to remove and replace traditional footrests before or after moving the occupant. The footrest 624 enables the caregiver complete access to the front of the chair when providing ingress and egress to the occupant. The footplate 624 folds up against the footrest support arms 625 and the footrest 624 can then be released to drop down along a radius and rest completely under the front edge of the seat 622 against the T-post 606. This enables the caregiver to have more secure and safe access to the occupant during occupant ingress and egress from the wheelchair. During use, the footrest 624 is pulled forward and is locked in position. In another embodiment, the footrest support arms 625 are telescoping, and can also be extended or retracted without removing them from the chassis assembly 601. The footrest 624 can be constructed of aluminum, steel, carbon fiber, polymer-based, a composite or another like material.

A rear arm assembly 630 is at each side of the chassis assembly 619. Each rear arm assembly 630 includes a sealed roller bearing at the rear to accommodate an axle connecting to the rear wheel 610 and sealed roller bearings in the end of the spindle 604 that are sized and dimensioned to match the diameter of the spindle. These bearings (not shown) ensure that the suspension system works without binding and unnecessary friction so that force is efficiently transferred to the shock absorption system, and not the chassis assembly. Each rear arm assembly 630 is constructed and arranged to provide internal room to incorporate a rear disc brake system on each rear wheel 610 for maximum control of the wheelchair 600. The illustrative disk brakes as described below are actuated by a hand control or controls (not shown) that causes brake pads to come in contact with the disk brakes. These hand controls can include a locking mechanism to act as static full time wheel locks when the wheelchair 600 needs to be locked in place. One end of the shock assembly 640 is attached to the rearward section of the rear arm assembly 630 at a position that is approximately over the center point of the rear wheel axle, mounted to the hub 611. The shock absorber mounting position can be adjusted by changing the mounting point in the connection channel 634. Each connection channel mounting point changes the suspension properties and the height of the center tube 602, and thus, the seat height. This also enables changes to the wheelbase (for example, shortening the wheelbase) for different applications. The rear arm assembly 630 can be constructed of aluminum, steel, carbon fiber, polymer-based, a composite or another like material.

The front arm assembly 632 is a suspension member that, like the rear arm assembly 630, both supports the wheelchair 600 and provides dissipation and absorption of energy from movement. There are two front arm assemblies 632, one on either side of the chassis assembly 601. Each front arm assembly 632 includes sealed roller bearings in the end of the spindles 604 that are sized to match the diameter of the spindle. These bearings (not shown) ensure that the suspension system works without binding and unnecessary friction so that force is efficiently transferred to the shock absorption system, and not the chassis assembly. One end of the shock assembly 640 is attached to the frontward section of the front section of the front arm assembly 632 just rearward of the mounting point for the caster wheel 636. The shock absorber mounting position can be adjusted by changing the mounting point in the connection channel 634. Each connection channel mounting point changes the suspension properties and the height of the center tube 602. The front arm assembly 632 can be constructed of aluminum, steel, carbon fiber, polymer-based, a composite or another like material.

The connection channel 634 is a structure that is U-shaped, having two sidewalls that include a plurality of aligned holes that are evenly spaced for attachment of the ends of the shock assembly 640. The connection channels 634 are used to determine the correct shock absorber mounting position depending upon the needs of the occupant and caregiver. The connection channels 634 can be constructed of aluminum, steel, carbon fiber, polymer-based, a composite or another like material.

The caster wheels 636 each are comprised of a set of forks, a wheel and a bearing assembly and provides for quick turning and front end maneuverability. In another embodiment, the caster wheels can be replaced with an omnidirectional wheel. The diameter FWD of a caster wheel 636 is approximately 5 inches (five inches). In an embodiment, each wheel can be filled with foam under pressure for a softer ride and puncture protection. In other embodiments, the wheels can be hard, pneumatic and filled with air or another gas and dimensioned larger or smaller. More generally, the size of the wheels and/or the structure and material of tire and hub construction are highly variable in a manner clear to those of skill. The hubs can be solid, spoked, wire, or a combination of such. The tires can be any acceptable thickness suitable for the terrain being traversed. According to various embodiments, the wheels can be interchangeable and wheel sets can be provided for various applications (e.g. indoor versus outdoor travel).

The shock tower 638 is a connection point for the front arm assembly 632 and the rear arm assembly 630. The shock tower 638 enables each front arm assembly 632 and the rear arm assembly 630 to move independently to absorb the force energy of impact from obstacles imparted to the arms through the caster wheel 636 and rear wheels 610. The shock tower 638 is securely locked to the spindles 602 by means of a keyway, spline, or pin mated to the shock tower 638 and the spindle 602. By locking the shock tower 638 to the spindle 602 and locating the shock assembly 640 attachment points at the same location at the top of the shock tower 638, energy that is imparted to the front arm assembly 632 and rear arm assembly 630 by encountering an obstacle is absorbed by the shock assemblies 640 and dissipated before any remaining force acts on the spindles 604 and center tube 602. By attaching the shock assemblies 640 to the top of the shock tower 638 as shown, energy is controlled and diminished which differs from other suspension systems in that those systems are primarily designed to transfer energy from the front to the rear or the rear to the front, not to dissipate and remove energy from the chassis system. Removing energy imparted to the chassis assembly by encountering an obstacle, not just relocating it to some other point on the wheelchair, is essential for the comfort of the caregiver and occupant and is unique to the wheelchair as shown. The shock tower 638 mechanism and chassis design on the wheelchair as shown also reduces the rocking motion of the chair inherent with four wheel independent suspension systems. The shock tower 638 provides that each front and rear arm assembly can be tuned independently depending on the type of terrain and environment in which the wheelchair as shown is used. This is truly an independent system with each separate wheel having the ability to be tuned to the caregiver and/ or occupant's desires. The shock tower 638 can be constructed of aluminum, steel, carbon fiber, polymer-based, a composite or another like material.

Shock assemblies 640 are mounted to each front arm assembly 632 and rear arm assembly 630, as set forth above. In illustrative wheelchair 600, the shock assemblies 640 can be independently tuned for each arm. The length of the shock assemblies 640 can be adjusted by use of a threaded mechanism on the shock assembly to adjust their performance, as set forth more fully below. In another embodiment, the shock assemblies 640 can be gas filled and they can be mounted underneath the suspension arms to provide more caregiver access to the front of the wheelchair 600. In a further embodiment, the under mounted gas shock assemblies can be traction shocks instead of compression shocks. The shock assemblies can be constructed of aluminum, steel, carbon fiber, polymer-based, a composite or another like material.

The center of gravity adjuster 642 is a center of gravity mechanism common to most wheelchairs that move from the front to the rear. This provides the ability to change the center of gravity and thus the ratio of percentage of weight loading the chassis assembly from front to rear. Changing this ratio changes the feel of the ride provided by the chassis, chair, and suspension system depending upon the caregiver and occupant's desires. The center of gravity adjuster can be constructed of aluminum, steel, carbon fiber, polymer-based, a composite or another like material.

Figure 7:
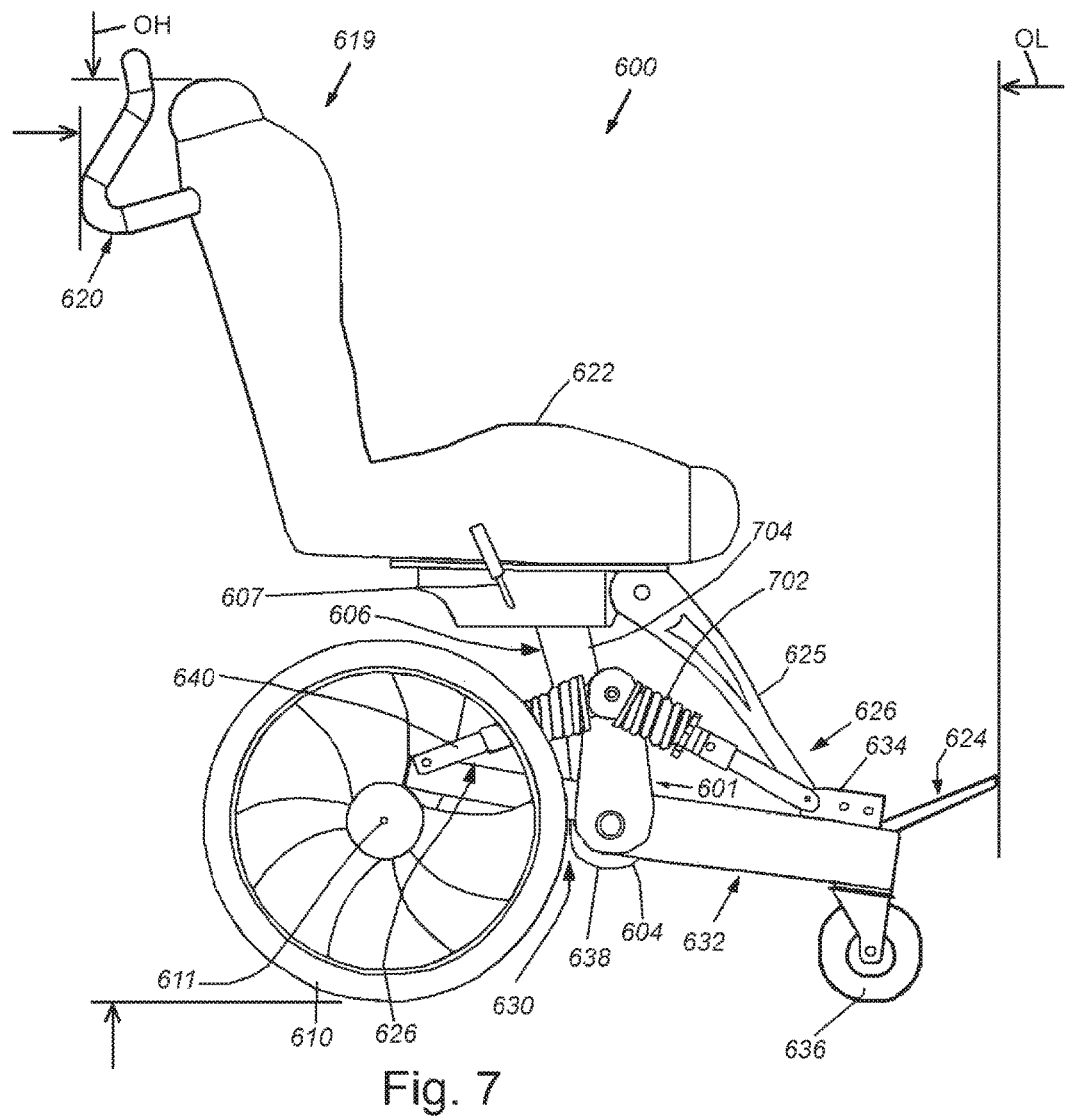
FIG. 7 is a side view of the wheelchair, according to the third embodiment.

In FIG. 7, the suspension assembly 626 includes a front coil spring assembly 702 mounted at one end on the shock tower 638 and at the other end at the connection channel 634 of the front arm assembly 632. A rear coil spring assembly 704 mounted at one end on the shock tower 638 and at the other end at the connection channel 634 of the rear arm assembly 630. In action, the rear wheel 610 is attached to the rear arm assembly 630 and energy from the movement of the rear wheel is dissipated and/or absorbed by the rear coil spring assembly 704 as the front of the rear arm assembly 630 as it pivots with regard to the spindle 604. In a like fashion, the front caster 636 is attached to the front arm assembly 632 and energy from the movement of the front caster wheel is dissipated and/or absorbed by the front coil spring assembly 702 as the rear of the front arm assembly 632 as it pivots with regard to the spindle 604. The wheelchair has an overall length OL of approximately 36 inches (91 cm) and an overall height OH of approximately 41 inches (104 cm).

Figure 8:
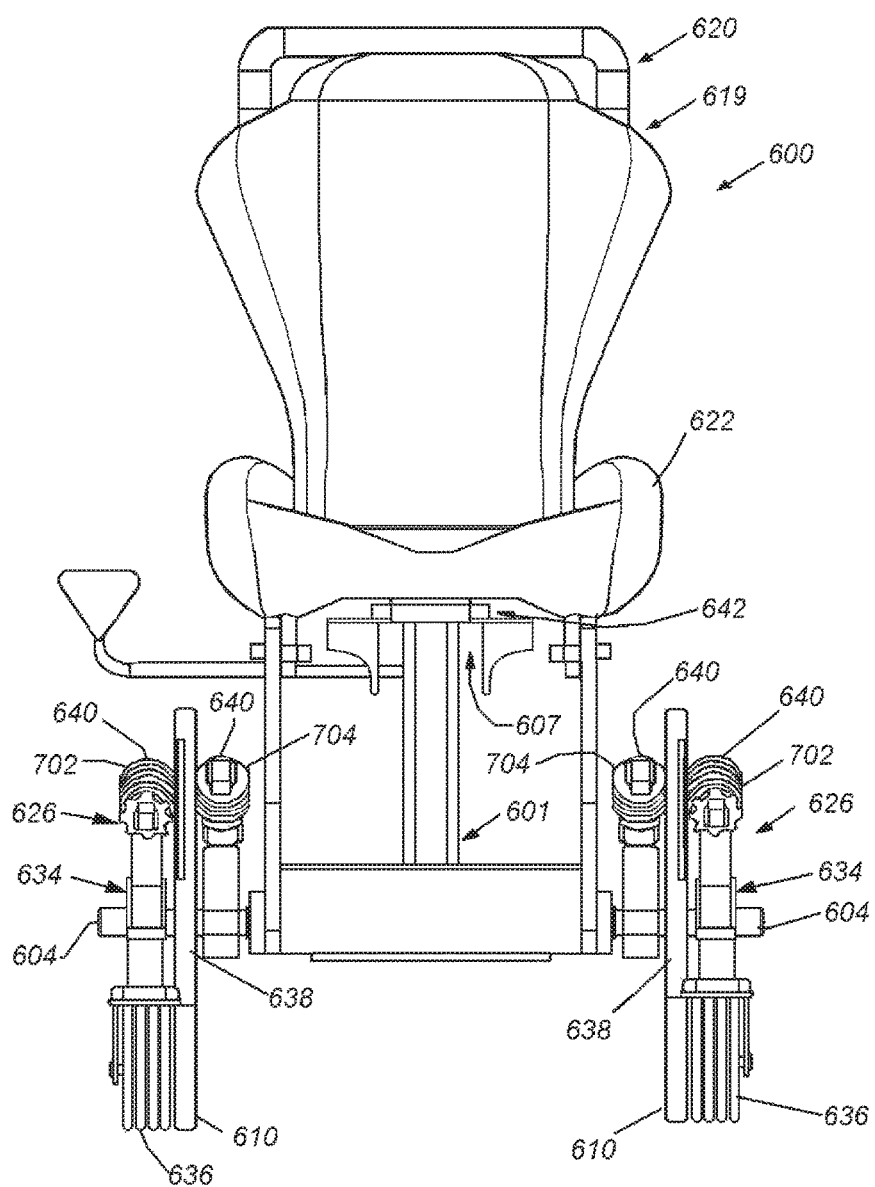
FIG. 8 is a frontal perspective view of the wheelchair, according to a third embodiment.

In FIG. 8, a front view of the wheelchair 600 depicts each front arm assembly 632 as being mounted to the outside of each shock tower 638 and each rear arm assembly 630 mounted on the inside of the shock tower 638, the "outside" being oriented in a direction away from the chassis assembly 601, while the "inside" is described as being closer to the chassis assembly 601. In another embodiment, the front arm assembly 632 can be mounted to the inside of each shock tower 638 and each rear arm assembly 630 can be mounted on the outside of the shock tower 638.

Figure 9:
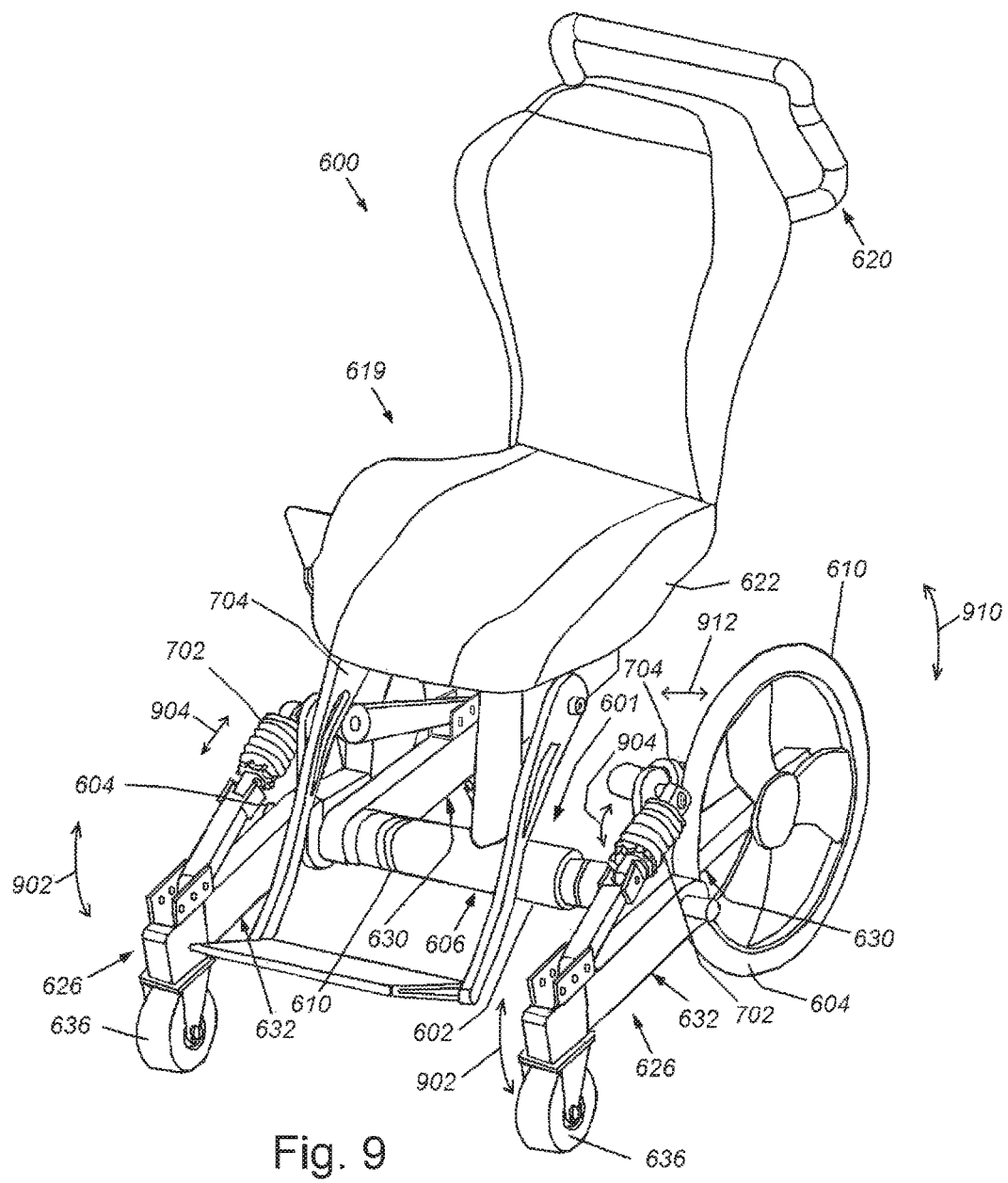
FIG. 9 is a perspective view of the wheelchair, according to the third embodiment.

With regards to FIG. 9, an upward and downward motion 902 of the front arm assembly 632 causes a corresponding motion 904 of the front coil spring assembly 702 to elongate or compress the coil spring. In a like fashion, an upward and downward motion 910 of the rear arm assembly 630 causes a corresponding motion 912 of the rear coil spring assembly 704 to elongate or compress the coil spring.

Figure 10:
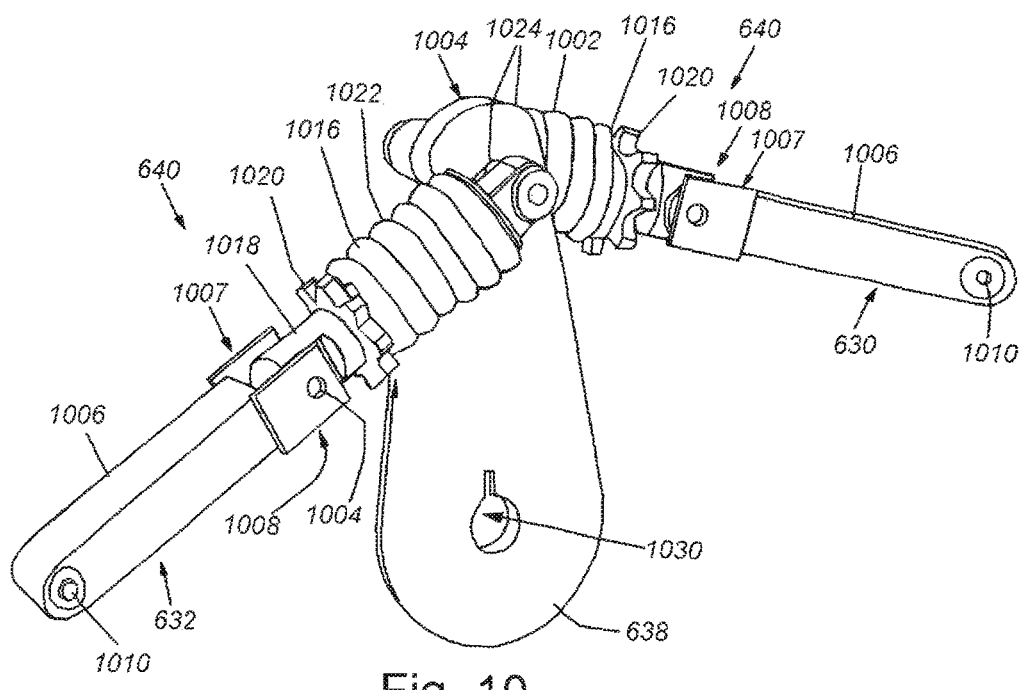
FIG. 10 is a view of the shock tower and shock assemblies, according to the third embodiment.

A detailed view of the shock tower 638 with two attached shock assemblies 640 is shown in FIG. 10. Each shock assembly 640 is connected at a pin 1002 located at the top end 1004 of the shock tower 638. Each shock arm 640 is comprised of a strut 1006 that includes a fork 1007 at the inner end 1008 and a through-hole 1010 at the outer end 1012. A pin 1014 connects the spring strut 1016 to the fork 1007 at the outer end 1018. A rotatable ring 1020 is at one end of a coil spring 1022 and can be rotated on a threading to shorten or lengthen the amount of movement for the coil spring. A fixed forward stop 1024 is located in proximity to the shock tower 638 and arrests the movement of the coil spring 1022. The shock tower is provided with a keyed hole 1030 that is a connection point for the spindle 604.

Figure 11:
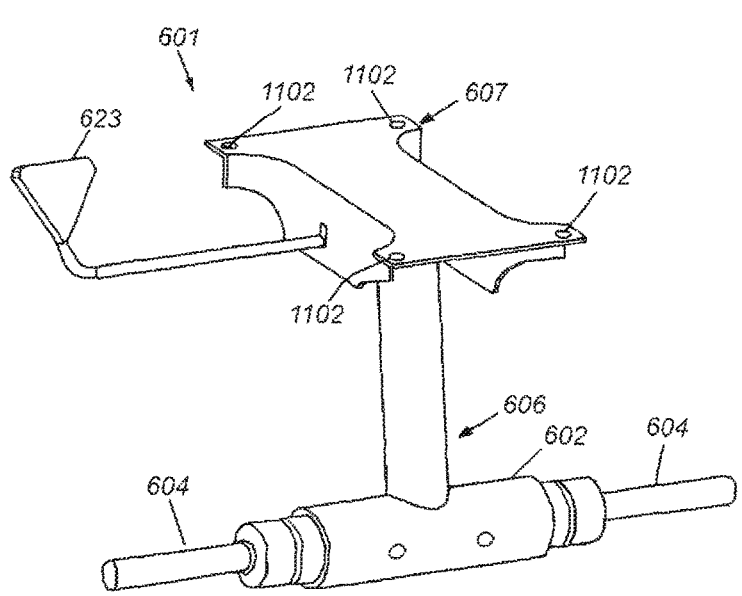
FIG. 11 is a view of a portion of the chassis assembly, according to the third embodiment.

A detailed view of the chassis assembly 619 is depicted in FIG. 11. The seat mounting support 607 is shown with a plurality of mounting holes 1102 for bolts (not shown) that can removably secure the chair assembly 601 (not shown).

Figure 12:
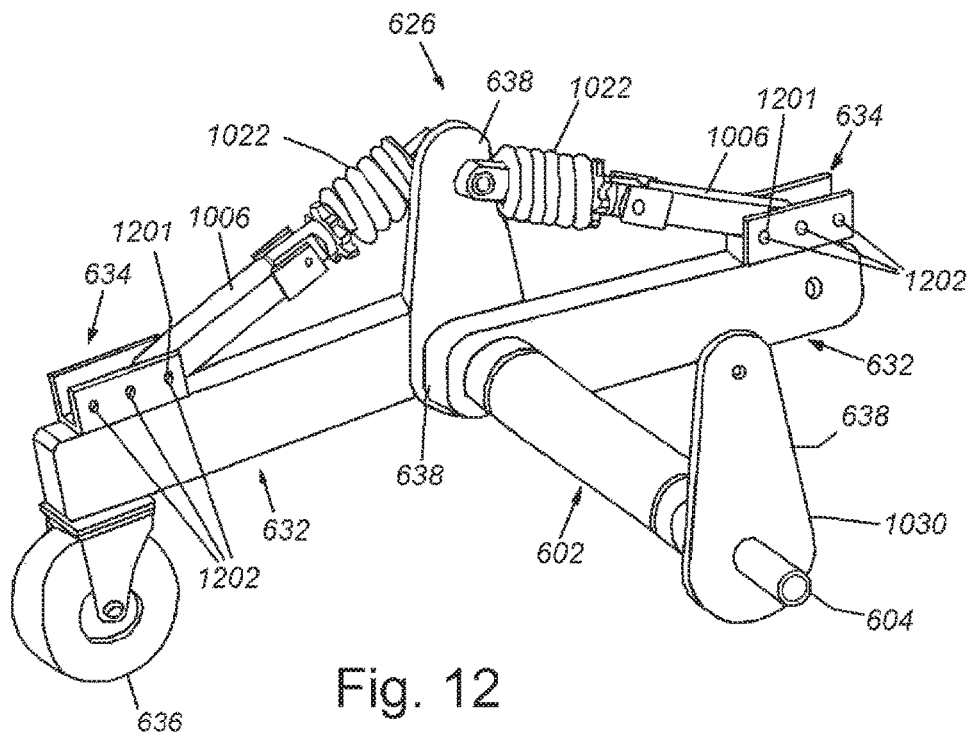
FIG. 12 is a view of the suspension assembly, according to the third embodiment.

The suspension assembly 626 and a portion of the chassis assembly are shown in FIG. 12. A pin 1201 connects a strut 1006 with the connection channel 634 by removably locking into one of a plurality of aligned holes that are evenly spaced. Movement of the pin 1201 from one hole 1202 to another changes the amount of movement in the shock assembly to stiffen or loosen the ride of the wheelchair 600.

Figure 13:
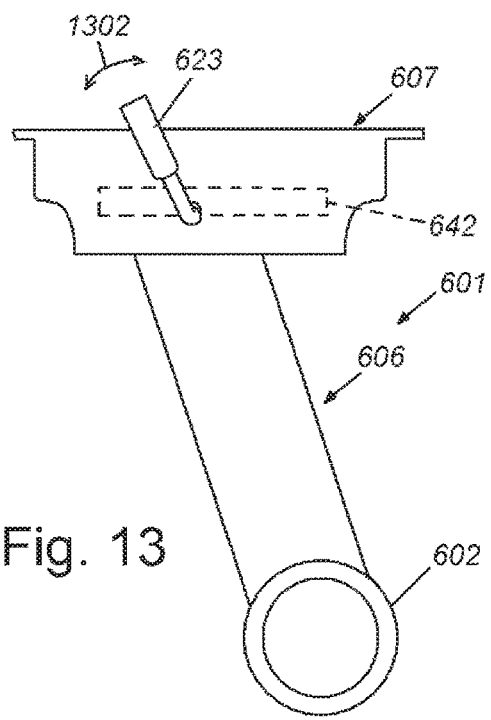
FIG. 13 is a side view of the chassis assembly, according to the third embodiment.

FIG. 13 is a side view of the chassis assembly 601. A handle 623 that moves in a range of motion 1302 locks and unlocks the center of gravity adjuster 642 that can change the center of gravity for the wheelchair 600 to adjust the quality of the ride for the occupant.

Figure 14:
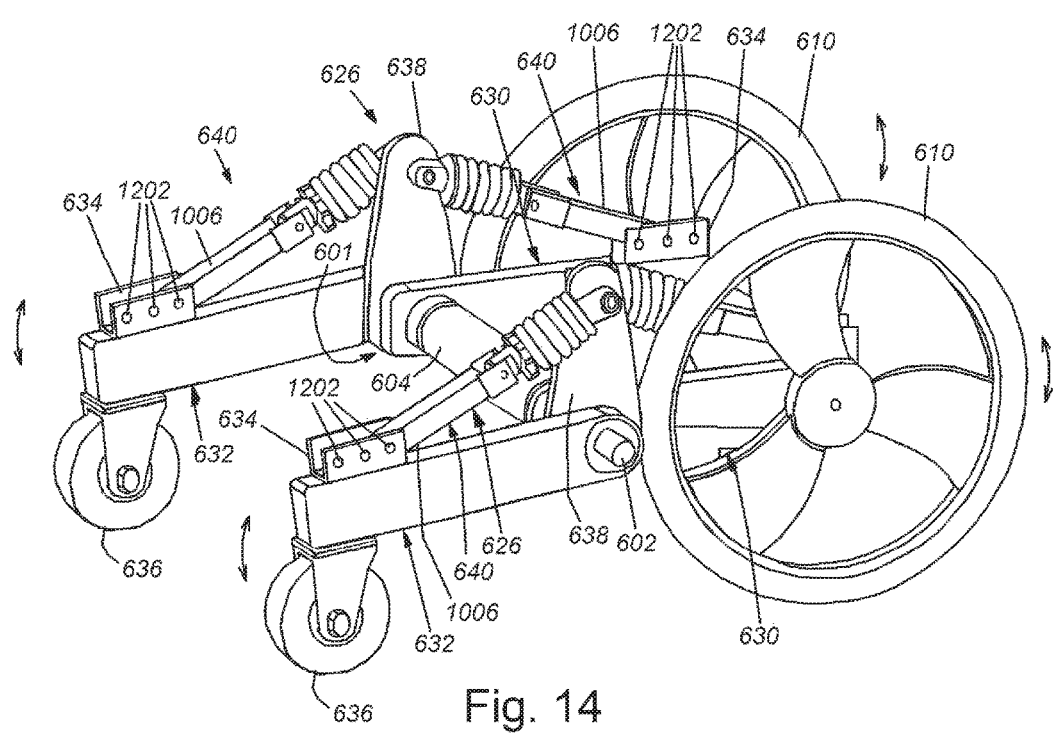
FIG. 14 is a view of the chassis assembly and suspension assembly, according to the third embodiment.

The suspension assembly 626 and a portion of the chassis assembly 601 is shown in FIG. 14. During movement, the respective rear arm assemblies 630 and front arm assemblies 632 move up and down relative to the spindle 602, with each shock assembly 640 compressing or lengthening based on the spring tension and the positioning of the struts 1006 in the aligned holes 1202 in the connection channels 634.

Figure 15:
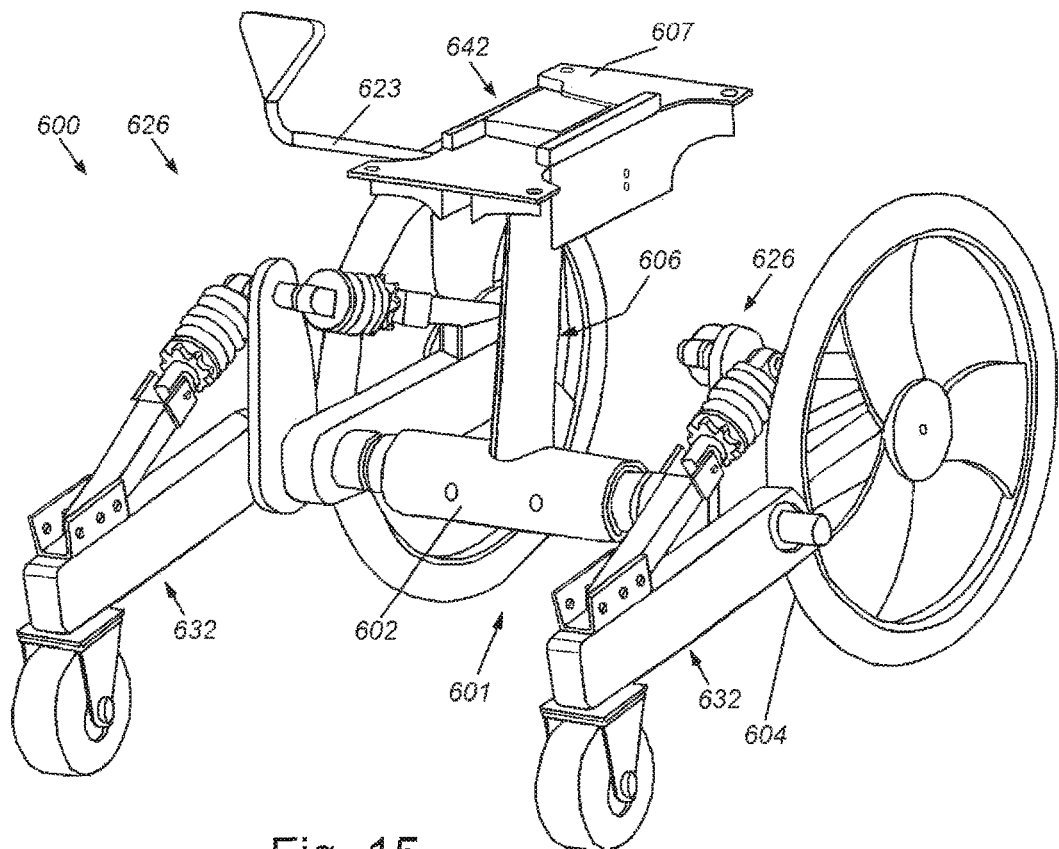
FIG. 15 is a view of the chassis assembly and suspension assembly, according to the third embodiment.

FIG. 15 is a view of the wheelchair 600 with the chair assembly 619 removed, with the chassis assembly 601 and suspension assembly 626 remaining. The center of gravity adjuster 642 is shown on top of the seat mounting bracket 607.

Figure 16:
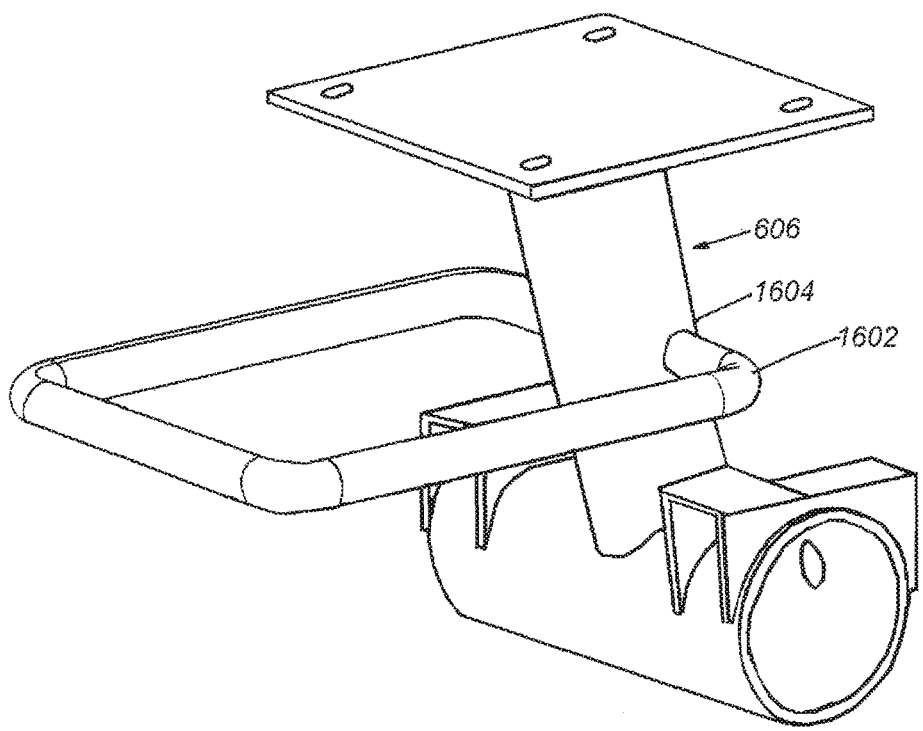
FIG. 16 is a view of a caregiver foot lever attached to the T-post, according to the third embodiment.

An optional caregiver foot lever 1602 is shown in FIG. 16. The foot lever 1602 is connected to the T-post 606 at mounting point 1604 that can be a welded connection. The foot lever 1602 is placed so as to allow a caregiver to use force from one of their feet to provide additional leverage to raise the front of the wheelchair 600 by placing their foot on the foot lever 1602 and pushing down. An additional option can be disc brakes mounted on the rear wheels, utilizing existing bicycle brake technology with a caliper handbrake mounted on the handle.

III. Gas Traction Shock System

Figure 17:
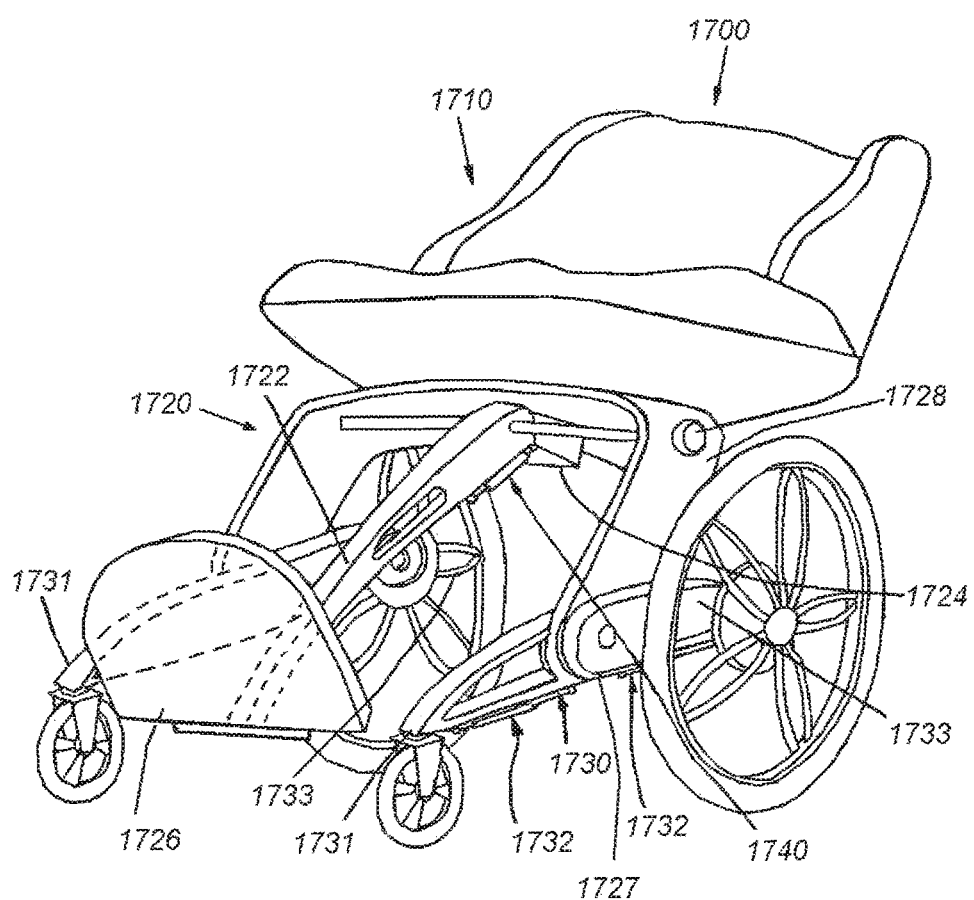
FIG. 17 is a perspective view of a wheelchair with a gas traction shock, according to a fourth embodiment.

A wheelchair 1700 with a gas traction shock system is shown in FIG. 17, according to an alternative embodiment. The wheelchair 1700, in the manner described above, is divided into three assembly groups of components: a chair assembly 1710, a chassis assembly 1720 and a suspension assembly 1730. A gas traction shock 1732 is shown as attached at one end to a footrest support arm 1722 and at the other end, to the underside of a seat support bracket 1724 and provides tension for the footrest 1726. The illustrative embodiment replaces the T-post of the above-described embodiment and instead uses a "bridge" like chassis that rests upon a suspension assembly that is comprised of two-part shock assemblies. This significantly reduces weight and increases accessibility to the user. The suspension functions remain the same as the first embodiment as well as the function of the chassis to dissipate energy imparted by encountering an obstacle. Each shock assembly is comprised of a front arm assembly 1731 and a rear arm assembly 1733. Each arm assembly is joined to the chassis assembly 1720 at the bottom 1727 of the chassis frame 1728. Gas traction shocks 1732 are located under the front and rear arm assemblies, mounted at the bottom 1727 of the chassis frame 1728. As used herein, the gas traction shocks 1732 on the suspension assembly function as the coil spring shock assemblies as set forth above.

Figure 18:
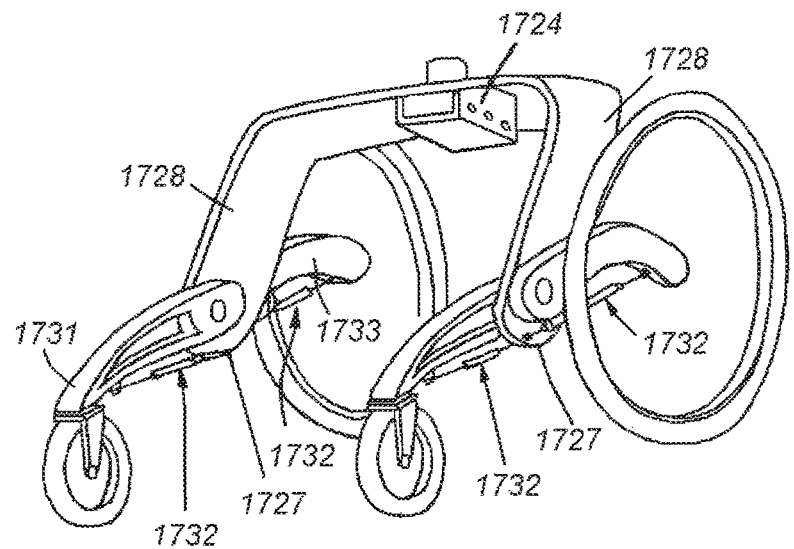
FIG. 18 is a view of a chassis assembly for the wheelchair with a gas traction shock, according to the fourth embodiment.

FIG. 18 shows the suspension and chassis assemblies without the chair assembly, according to the alternative embodiment. The gas traction shocks 1732 are shown in their places mounted under the suspension arms (front arm assembly 1731, rear arm assembly 1733).

Figure 19:
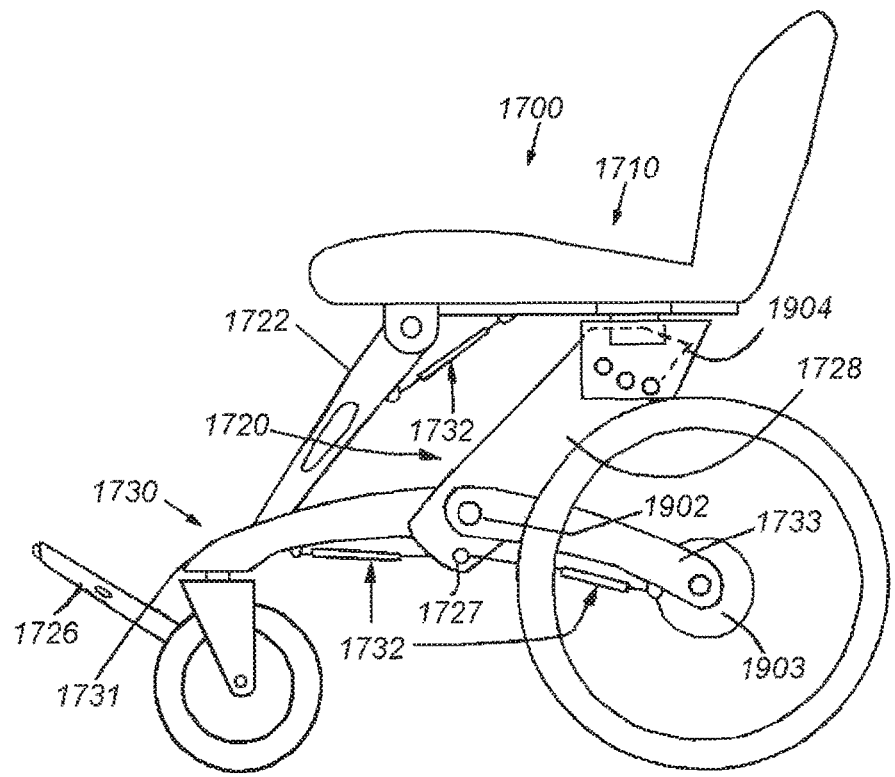
FIG. 19 is a side view of the wheelchair with a gas traction shock, according to the fourth embodiment.

FIG. 19 is a view of the wheelchair 1700 according to the alternative embodiment, showing the location of the connecting point 1902 located on the chassis frame 1728 for connection of the front arm assembly 1731 and the rear arm assembly 1733. This is the pivot point for the movement of those arm assemblies. At least one of the two rear wheels can be provided with a disc brake 1903. A seat angle adjuster 1904 can modify the angular orientation of the seat.

Figure 19A:
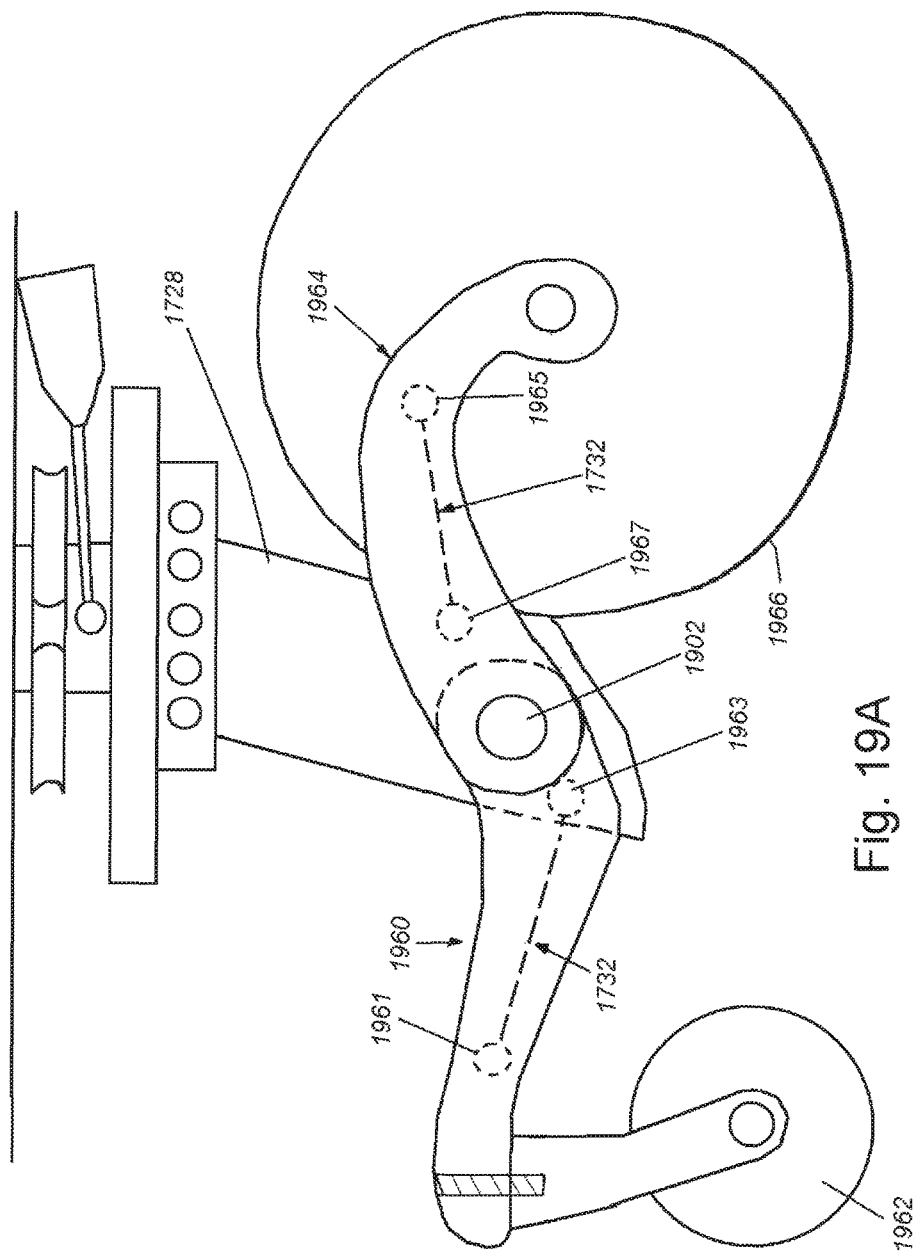
FIG. 19A is a side view of a wheelchair with an alternate position for the gas traction shock, according to the fifth embodiment.

FIG. 19A is an alternate embodiment with gas traction shocks 1732 wherein the gas traction shocks are located inside of the suspension arm assemblies, rather than below (as set forth above in FIG. 19). A front suspension arm 1960 with a front wheel 1962 is provided with a gas traction shock 1732 that is secured at one end at a point 1961 towards the front of the front suspension arm 1960 and at the other end at a point 1963 on the chassis frame 1728. A rear suspension arm 1964 is provided with a gas traction shock 1732 that is secured at one end at a point 1965 towards the rear of the rear suspension arm 1964 and at the other end at a point 1967 on the chassis frame 1728. In a further embodiment, it is expressly contemplated that the gas traction shocks can be located at points above the suspension arm assemblies.

IV. Torsion Spring Shock Assembly

Figure 20:
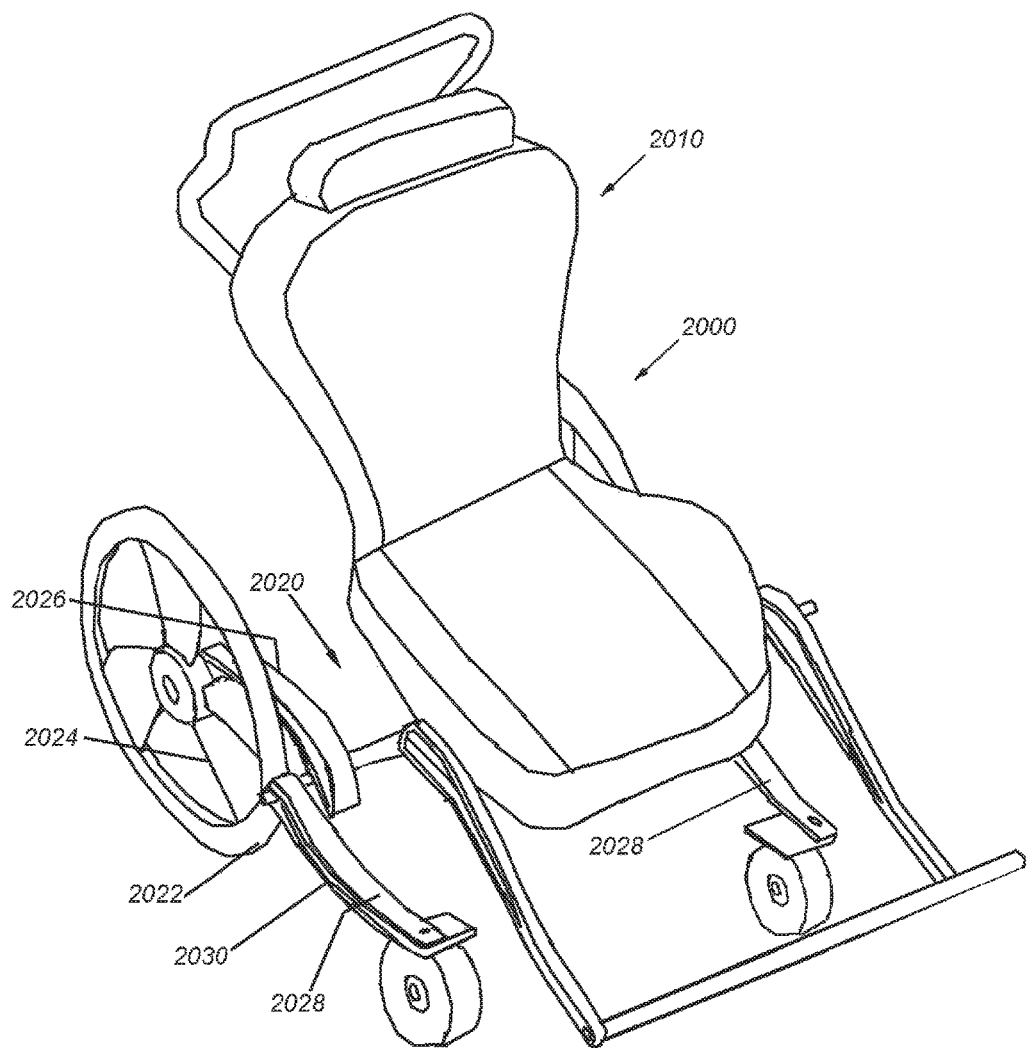
FIG. 20 is a perspective view of a wheelchair with a torsion spring shock system, according to a sixth embodiment.

FIG. 20 shows a wheelchair 2000 that is comprised of three component assemblies: a chair assembly 2010 that functions as described above, a chassis assembly 2020 and a suspension assembly 2030. The suspension assembly 2020 includes a spindle 2022, a torsion spring 2024, a rear arm assembly 2026 and a front arm assembly 2028.

Figure 21:
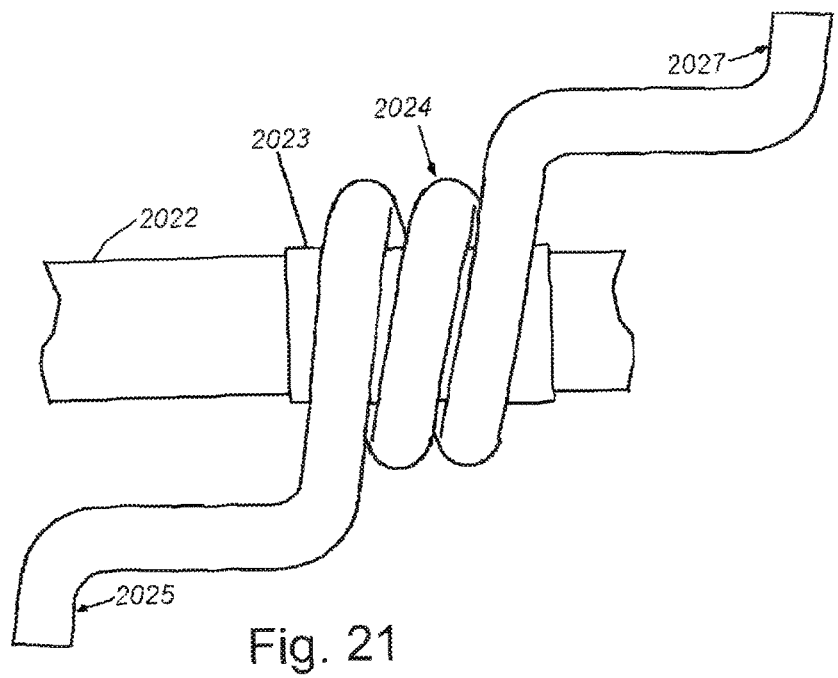
FIG. 21 is a detail view of a torsion spring, according to the sixth embodiment.

The torsion spring 2024 is shown in greater detail in FIG. 21. The torsion spring 2024 is wrapped around a sleeve 2023 that is a hollow tube mounted on the spindle 2022. A pair of ends, 2025 and 2027, can be connected to respective arm assemblies (not shown).

V. Independent Four Arm Suspension Assembly

Figure 22:
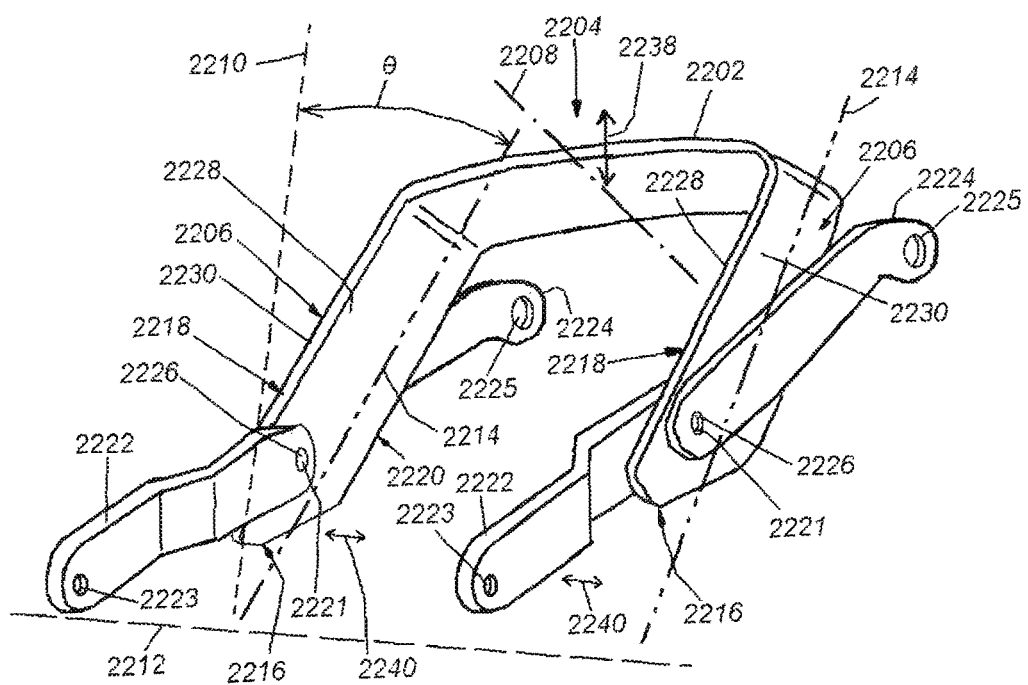
FIG. 22 is a perspective view of a chassis for a wheelchair, according to a seventh embodiment.

A wheelchair with an independent suspension that includes an assembly of four suspension arms is depicted in FIGS. 22-39. A chassis assembly 2200 for a wheelchair is shown in FIG. 22. In an embodiment, the chassis assembly 2200 is a single chassis plate 2202 of a material that is folded and/or molded into a shape that resembles an upside down "U"(e.g., a "bridge") and includes a relatively horizontal portion 2204 and two support portions 2206. The material of the chassis plate can be a metal (for example, aluminum), a metallic alloy (for example, steel) or a composite material (for example, a carbon fiber product). In another embodiment, the chassis can be constructed of tubular members. The space under the chassis plate 2202 defines a space that can be used for storage of objects (for example, personal care supplies, medical equipment, electronic equipment, or other useful items). The weight and dimensions of the chassis 2200 can vary depending on the material used, the size and weight of the occupant. A midpoint center axis 2208 is an axis drawn from front to back through the center of the chassis plate 2202 and is perpendicular to the orientation of the horizontal portion 2204. A vertical axis 2210 is defined as an axis drawn on a line extending from the center of the earth outwards and is perpendicular to the horizontal axis 2212 of a surface. The chassis assembly 2200 is oriented such that it is off-center relative to the vertical axis 2210. A set-off axis 2214 drawn through the support portions 2206 from a bottom point 2216 through the respective support portion 2206, such that it can be midway between a front ("leading") edge 2218 and the back ("trailing") edge 2220 of the chassis, describes a set-off angle θ with the vertical axis 2210. In an embodiment, the set-off angle θ is approximately fifteen degrees (15°) (±3°). In other embodiments, the set-off angle can be greater or lesser. A mounting hole 2221 can be located near the bottom 2216 of the chassis, and between the front edge 2218 and the set-off axis 2214. The mounting hole 2221 is a hole on each suspension portion 2206 extending through the material of the chassis plate 2202 and providing a mounting point for the connection of a front suspension arm 2222 and a rear suspension arm 2224. The front suspension arm 2222 and the rear suspension arm 2224 are connected to each other at an axle 2226 that resides within the mounting hole 2221. The front suspension arm 2222 includes a front mounting hole 2223 for mounting a front wheel (not shown). The rear suspension arm 2224 includes a front mounting hole 2225 for mounting a rear wheel (not shown). The chassis assembly 2200 functions to provide a connection between an occupant and the wheels, as well as a suspension element to dissipate energy from jolts and movement. As a suspension element, the chassis assembly 2200 defines a spring. The horizontal portion 2204 is generally rigid, but is sufficiently flexible to provide for upwards and downwards motion 2238 that is greatest in the vicinity of the midpoint center axis 2208 and lesser towards the suspension portions 2206. The suspension portions 2206 can flex inwards and outwards with a limited range of motion 2240. The effects of these various motions will be described more fully below. In another embodiment, the front wheels 2302 can be omni wheels, casters or another style of wheel. The rear wheels 2304 can be solid wheels, spoked wheels, or with bladed spokes. It should be noted that the wheelchair as depicted in an embodiment does not include in its depictions arm rests for the seat or restraint devices (for example, a seat belt harness), but it is contemplated that such devices can be provided with the wheelchair, as set forth above. Furthermore, as noted herein, the seats are exchangeable with other seats and it is contemplated that more than one seat can be provided with a chassis assembly as part of a kit.

Figure 23:
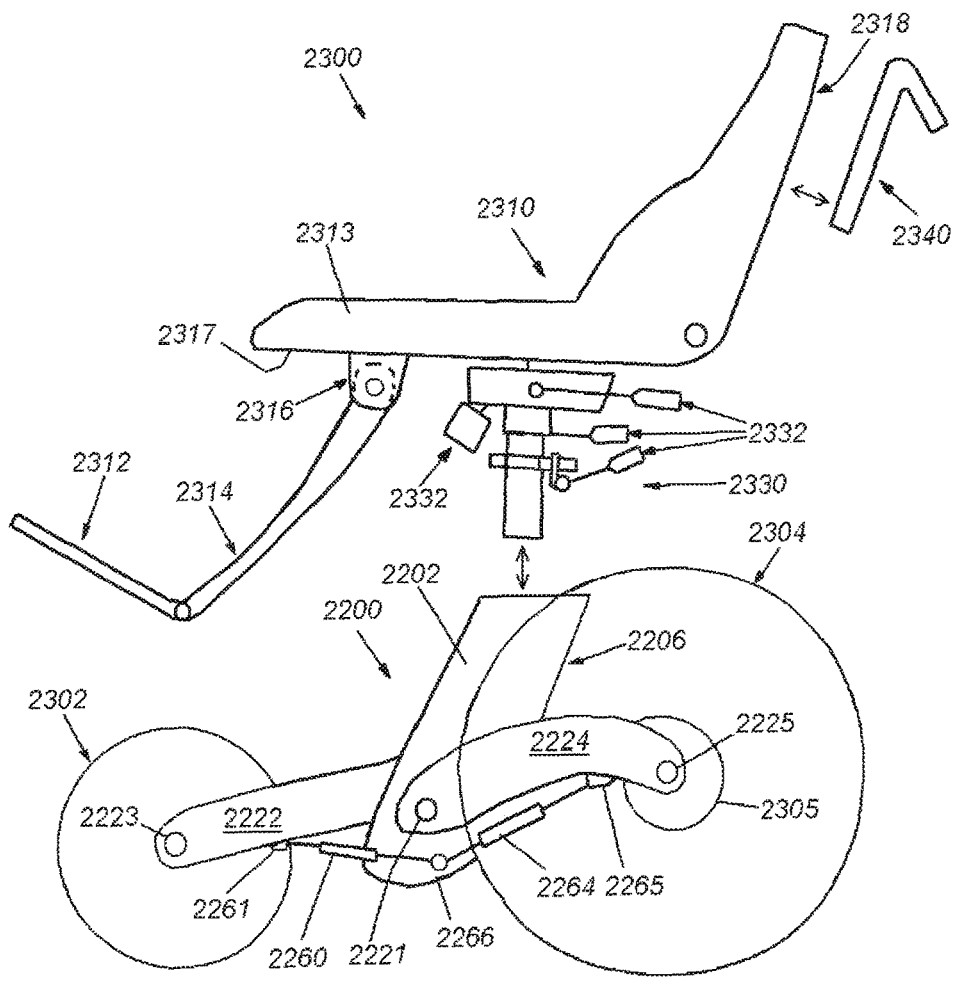
FIG. 23 is an exploded view of a wheelchair, according to the seventh embodiment.

The relationship of the chassis assembly 2200 with the rest of the wheelchair 2300 is shown in FIG. 23 in an exploded view. The chassis assembly 2200 is provided with a pair of relatively small front wheels 2302 attached to the front suspension arm 2222 and a pair of relatively larger rear wheels 2304 attached to the rear suspension arm. The rear wheels 2304 can be slowed and/or arrested by operation of a braking system 2305 (described more fully below). A seat assembly 2310 is attached to a mounting pillar 2330 that is itself mounted onto a chassis assembly 2200. The mounting pillar 2330 is a universal mounting device and facilitates the interchange of seats. It is contemplated that the mounting pillar can include interactive plates, magnets, or another connecting mechanism. The chassis assembly 2200 includes the wheels 2302, 2304 and a pair of shock absorbers 2260, 2264 that are mounted at a central mounting point 2266 and define a suspension assembly. In the illustrative embodiment, the shock absorbers 2260, 2264 are mounted below the front and rear suspension arms 2222, 2224. The front shock absorber 2260 is attached at one end to the central mounting point 2266 and at the other end at a mounting point 2261 on the front suspension arm 2222 located at a place between the front mounting hole 2223 and the central mounting point 2226. The rear shock absorber 2264 is attached at one end to the central mounting point 2266 and at the other end at a mounting point 2265 on the rear suspension arm 2224 located at a place between the rear mounting hole 2225 and the central mounting point 2226. When the shock absorbers are mounted below the suspension arms, the central mounting point 2266 is situated below mounting hole 2221. It is expressly contemplated that the placement of the mounting point 2266 can be modified and moved (e.g., by providing several holes or a slot for the movement of the mounting point within that slot). It is contemplated that the positions of the shock absorber mounting points 2261 and 2265 can be adjustable along their respective suspension arms. In an embodiment, the suspension arms can be constructed and arranged of a semi-rigid composite material (for example, carbon fiber) that dissipate energy through flexing upwards and downwards, with the front and/or rear suspension arm being directly attached to the axle.

Mounting pillar 2330 is an assembly that includes a plurality of adjustment levers 2332 that including but not limited to at least one of each of controls for adjusting the center of gravity, the tilt of the chair assembly, a rotating mechanism for rotating the chair assembly and a locking mechanism for locking in place the chair assembly 2310. It is contemplated that these mechanism actuations can be actuated by a torsion spring, an electronic solenoid or via a wireless device with an application. The chair assembly can include at least one footrest 2312 that is connected to the seat 2313 by a footrest arm 2314 at a mounting point 2316 located on a bottom surface 2317 of the seat 2313. A handle assembly 2340 can be mounted to the seat back 2318.

Figure 24:
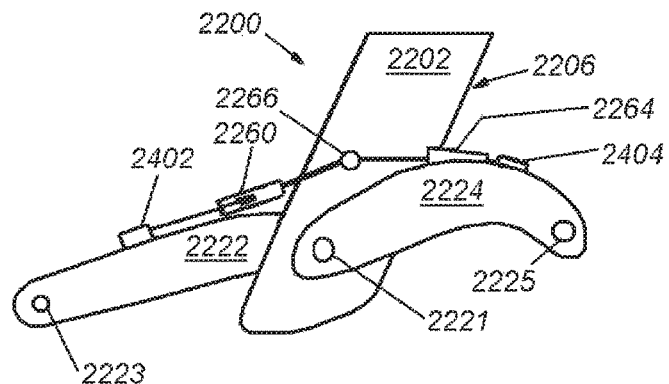
FIG. 24 is a side view of a chassis for a wheelchair, according to the seventh embodiment.

FIG. 24 shows a chassis assembly 2200 wherein the shock absorbers 2260, 2264 are situated above the suspension arms. When the shock absorbers are mounted above the suspension arms, the central mounting point 2266 is situated above mounting hole 2221. The front shock absorber 2260 is attached at one end to the central mounting point 2266 and at the other end at a mounting point 2402 on the front suspension arm 2222 located at a place between the front mounting hole 2223 and the central mounting point 2226. The rear shock absorber 2264 is attached at one end to the central mounting point 2266 and at the other end at a mounting point 2404 on the rear suspension arm 2224 located at a place between the rear mounting hole 2225 and the central mounting point 2226.

Figure 25:
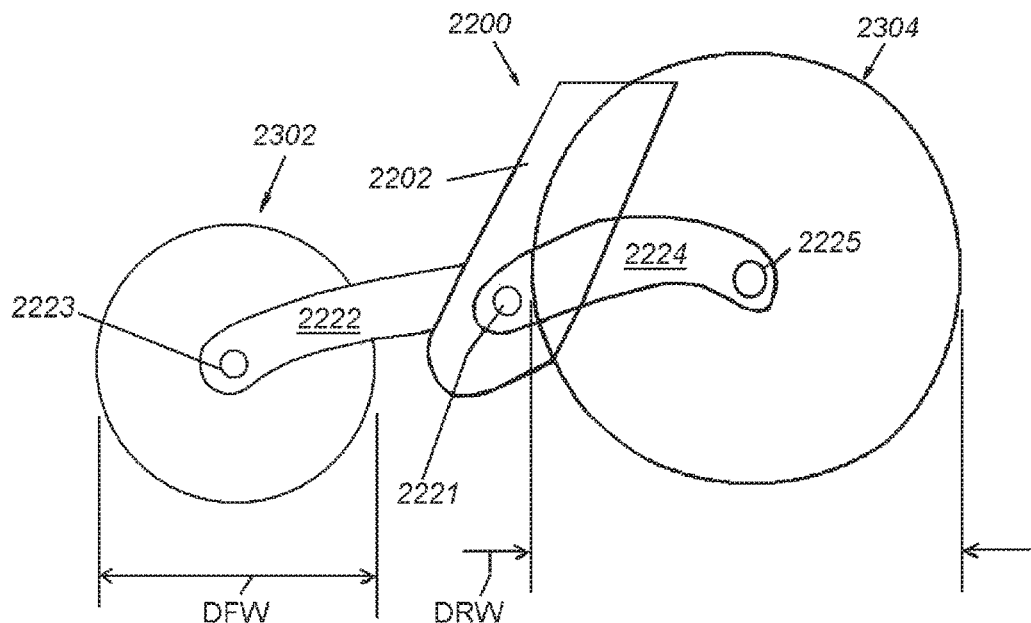
FIG. 25 is a side view of a chassis with wheels for a wheelchair, according to the seventh embodiment.

FIG. 25 is a schematic view of a chassis assembly 2200 with wheels, showing that diameter of the wheels. As noted above, the size and shape of the wheels can vary. In an illustrative embodiment, a front wheel 2302 has a diameter DFW of approximately 8 inches (±3 inches) and a rear wheel 2304 has a diameter DRW of approximately 16 inches (±2 inches). In other embodiments, it is contemplated that the front and rear wheels can be smaller or larger. The size of the wheels can affect the dissipation of the energies from impacts. For example, when the front wheel encounters an object head on, the front wheel diameter directly affects the physics of chassis/suspension response to the introduction of energy at impact and its dissipation thereafter. The larger the wheel diameter, the less noticeable the impact; however, in certain situations smaller diameter front wheels are desired. Smaller diameter wheels absorb impact much quicker over time from the moment of impact to actually starting the process of rising over the object, transferring energy at a higher rate than larger diameter wheels. The illustrative wheelchair mitigates the high rate of energy transfer with smaller wheels by a) changing the angle of the of the shocks from their attachment point on the chassis to their attachment point on the respective suspension arm at mounting point 2261 on the front suspension arm 2222 and at mounting point 2265 on the rear suspension arm 2224, b) adjusting the distance between the axle center point 2910 and mounting point 2266, and c) adjusting the properties of the shock absorbers.

Figure 26:
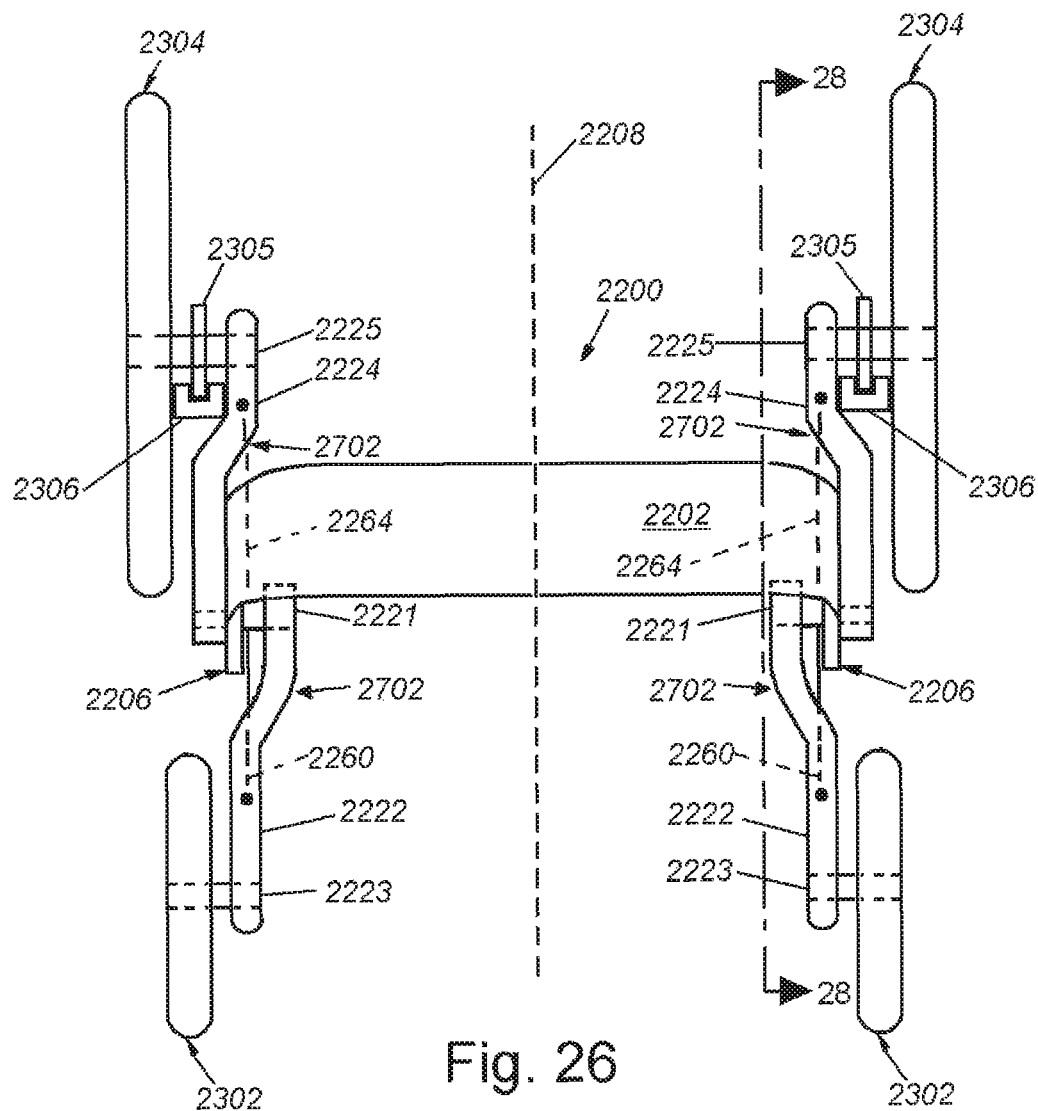
FIG. 26 is a top view of a chassis for a wheelchair, according to the seventh embodiment.

FIG. 26 is a top view that shows the relative placement of the wheels 2302, 2304, suspension arms 2222, 2224, and their respective mountings, relative to the chassis assembly 2200. The braking systems 2305 are depicted in an illustrative embodiment as a disk brake system with brake shoes 2306. The braking system will be described more fully below. The rear wheels 2304, braking systems 2305 and rear suspension arms 2224 are attached to the chassis assembly 2200 at the support portions 2206 on the outside of the support portion 2206. The front wheels 2302 and front suspension arms 2222 are attached to the chassis assembly 2200 at the support portions 2206 on the inside of the support portion 2206. Conversely, the front suspension arms can be on the outside of the support portion, and the rear suspension arms can be on the inside of the support portion. Thus, the support portion 2206 is between the suspension arms and wheels, and can better transmit and dissipate evenly side-to-side force energies than if both front and rear suspension arms and wheels were either inside or outside the support portion. The front and rear wheels are independent of each other and are mounted independently to the chassis, without direct connections.

Figure 27:
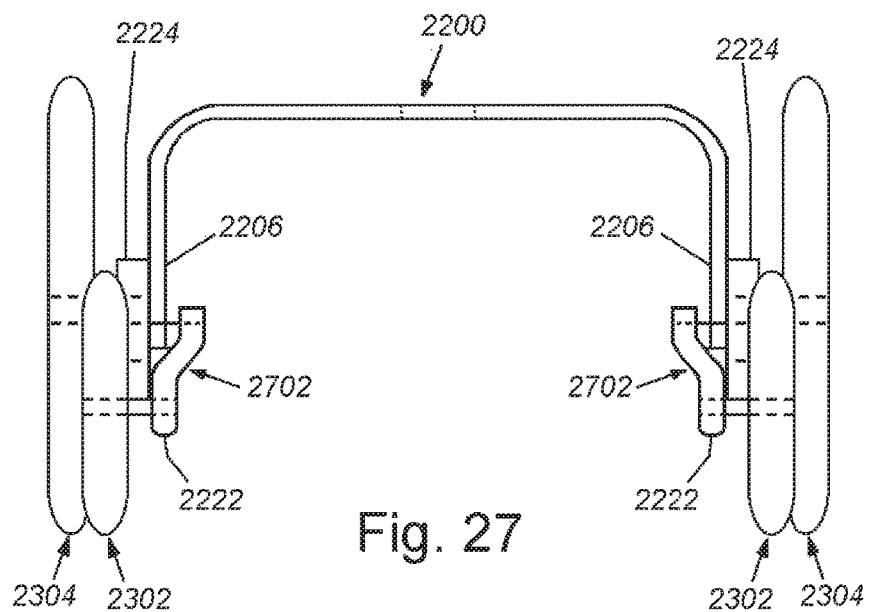
FIG. 27 is a front view of a chassis for a wheelchair, according to the seventh embodiment.

FIG. 27 is a front view of the chassis assembly 2200 with wheels as depicted in FIG. 26. The front wheels 2302 can be placed slightly inside of the rear wheels 2304 so as not to share the same path relative to where the wheels meet the ground. The suspension arms 2222, 2224 can be provided with bends 2702 that add a folding to the suspension arms and this folding creates an additional spring motion at the bends 2702 that can further dissipate lateral force energy. The slightly inset front wheels create a second set of tread marks within the marks of the outer wheels and this can be advantageous when moving over broken terrain features. The relatively narrower front reduces the turning radius and increases the responsiveness of the wheel chair for the caregiver.

Figure 28:
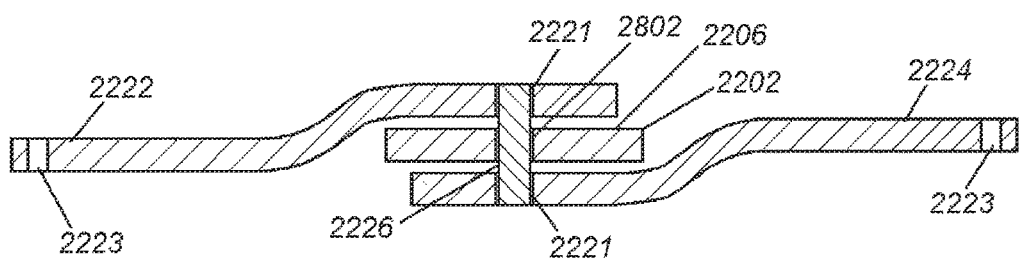
FIG. 28 is a cross section view of the suspension arms, taken along line 28-28 of FIG. 26, according to the seventh embodiment.

FIG. 28 shows a cross section along lines 28-28 of FIG. 26. The support portion 2206 includes a hole 2802 that passes through the material of the chassis plate 2202. Axle 2226 is situated within hole 2802 and holes 2221 of the forward suspension arm 2222 and rear suspension arm 2224.

Figure 29:
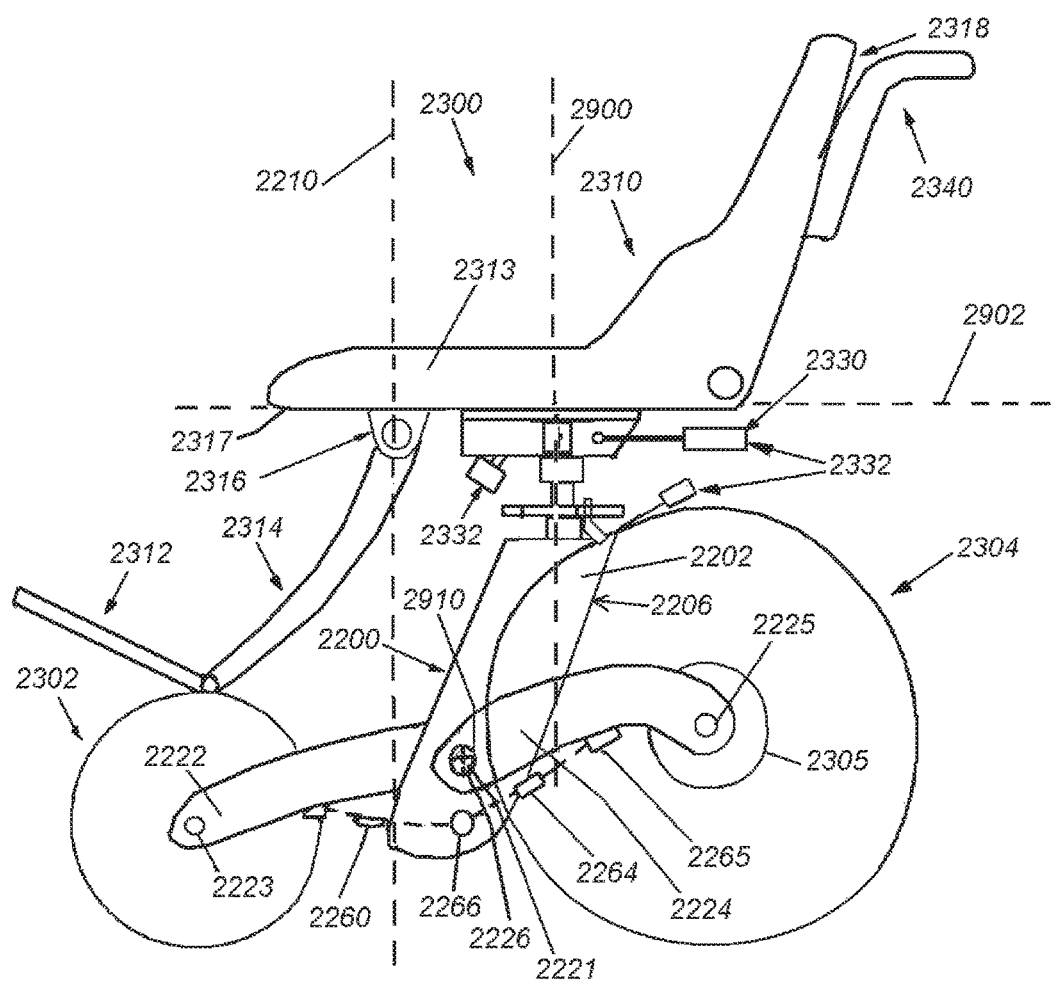
FIG. 29 is a side view of a wheelchair, according to the seventh embodiment.

An illustrative wheelchair is shown with FIG. 29. Vertical axis 2210 is oriented to the leading edge of the chassis plate 2202. A second vertical axis 2900 is defined as parallel to vertical axis 2210 and drawn through the center of the mounting pillar 2330 and through the seat 2313, at or near the center of gravity. The set off angle of the support portion 2206 places the second vertical axis 2900 (the approximate center of gravity) behind vertical axis 2210. Horizontal plane 2902 is a plane drawn across the seat bottom 2317 and is perpendicular to vertical axis 2210. The horizontal plane 2902 is located above the tops of wheels 2302, 2304. This allows the seat 2313 to fully rotate above the wheels, without interference or obstruction. The length of the support portions 2206 of the chassis plate 2202 determines how flexible the bridge will be when reacting to forces. The greater the length, the greater the flexibility of chassis plate 2202 (the "bridge"). Conversely, the shorter the length, the less flexible the chassis plate 2202 will be. Changing the setoff angle of the support portion outward from a true vertical orientation can also make the chassis plate 2202 more flexible. Thus, the chassis can be "tuned" to the desires and conditions of the terrain, the occupant and the caregiver, to adjust the "ride" of the wheelchair. In summary, ride quality can be adjusted by a) varying the length of the side portions of chassis plate 2202, b) changing the outward angle of the side portions of chassis plate 2202, c) adjusting the angle of the shock absorbers by moving the mounting point 2266 or changing the relative distance between centerpoint 2910 of the axle 2226 and the shock mounting point 2266, d) adjusting the tension properties of the shock absorbers, and e) replacing tires and/or wheels with tires and/or wheels of different sizes, widths, materials or tread. This allows the chassis to be specifically tuned to the individual user and caregiver, and/or, enables a generic product such that one chassis/suspension configuration can serve a wide weight range of users.

Figure 30:
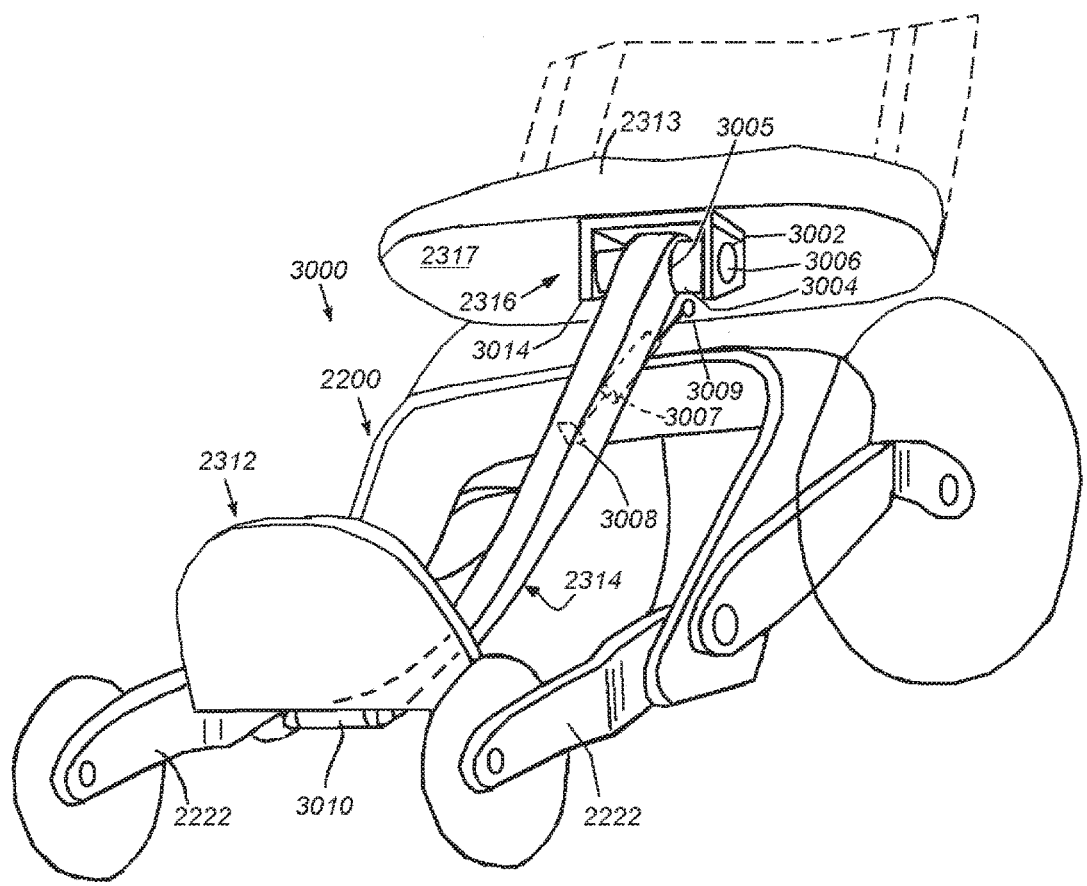
FIG. 30 is a perspective view of a wheelchair with a single footrest, according to the seventh embodiment.
Figure 31:
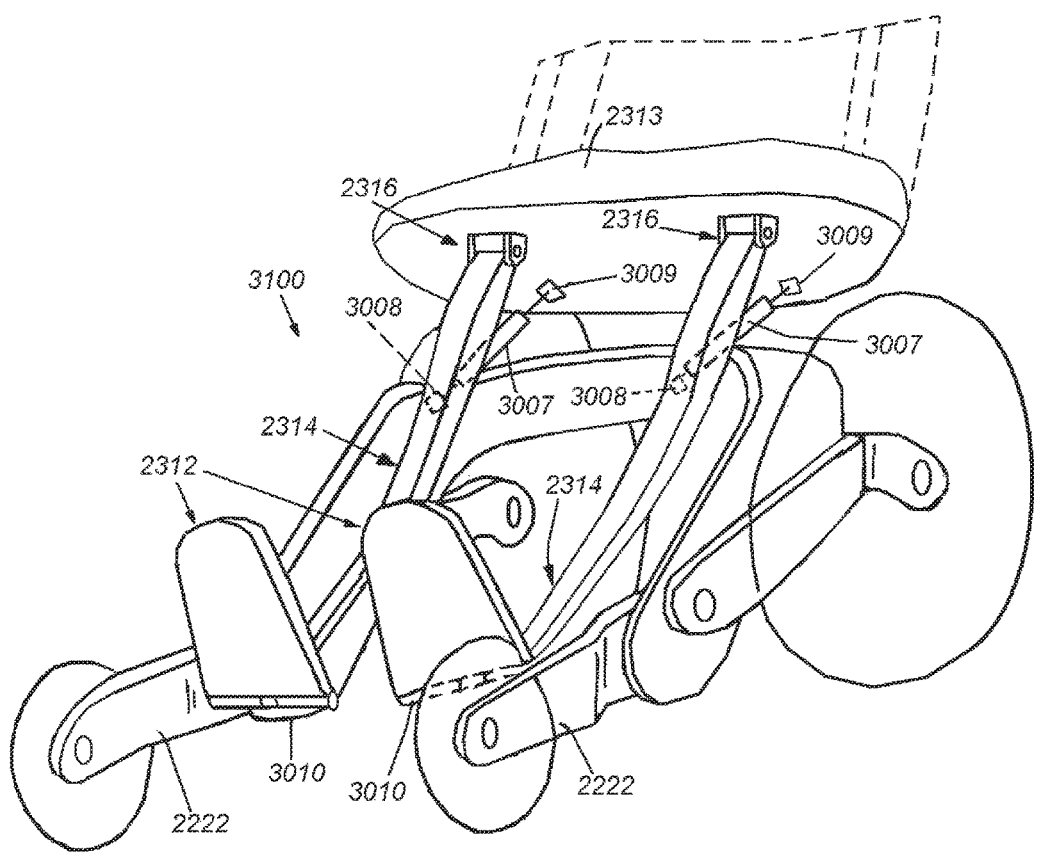
FIG. 31 is a perspective view of a wheelchair with two footrests, according to the seventh embodiment.

FIGS. 30 and 31 show a wheelchair in two variants, one variant 3000 provided with a single footrest arm 2314 and footplate 2312 and the other variant 3100 provided with two footrest arms 2314 and two footplates 2312. Attachment of the footrest to the chair, rather than to the chassis, reduces shock energy and isolates the feet and legs. With reference to FIG. 30, a footrest 2312 is located between the front suspension arms 2222 and provides support to the feet of the occupant, both to support the feet and legs in a desired orientation and to protect the feet from coming in contact with features in the terrain being traversed. The footrest 2312 is joined at the front end to a footrest arm 2314 at a junction 3010 that in an illustrative embodiment is a hinge. The footrest arm 2314 is joined to the seat bottom 2317 at a mounting point 2316. The mounting point 2316 is an assembly for connecting the footrest 2312 and footrest arm 2314 to the seat 2313 and the rest of the wheelchair. A receiving mount body 3002 includes a side hole 3006 on either side for receiving and retaining an axle 3004. The axle 3004 passes through a through-hole 3005 in the footrest arm 2314. It is contemplated that the mounting point can include a locking mechanism for holding the footrest arm 2314 in a desired orientation. The footrest arm 2314 can include an arm support assembly 3007 that is attached to the footrest arm 2314 at a front mounting point 3008 and to the seat bottom 2317 at mounting point 3009. The arm support assembly 3007 provides smooth resistive motion when raising and lowering the footrest and provides adjustment by locking the footrest and footrest arm when raised or lowered to the proper height, thereby increasing the comfort for the occupant, and ease of adjustment for the caregiver.

FIG. 31 depicts a wheelchair variant 3100 with two each of a footrest 2312, footrest arm 2314, and mounting point 2316. This allows an occupant to place one foot on each of the footrests. It is contemplated that orthopedic and/or comfort considerations can result in each of the footrests 2312 being set at a different height orientation.

Figure 32:
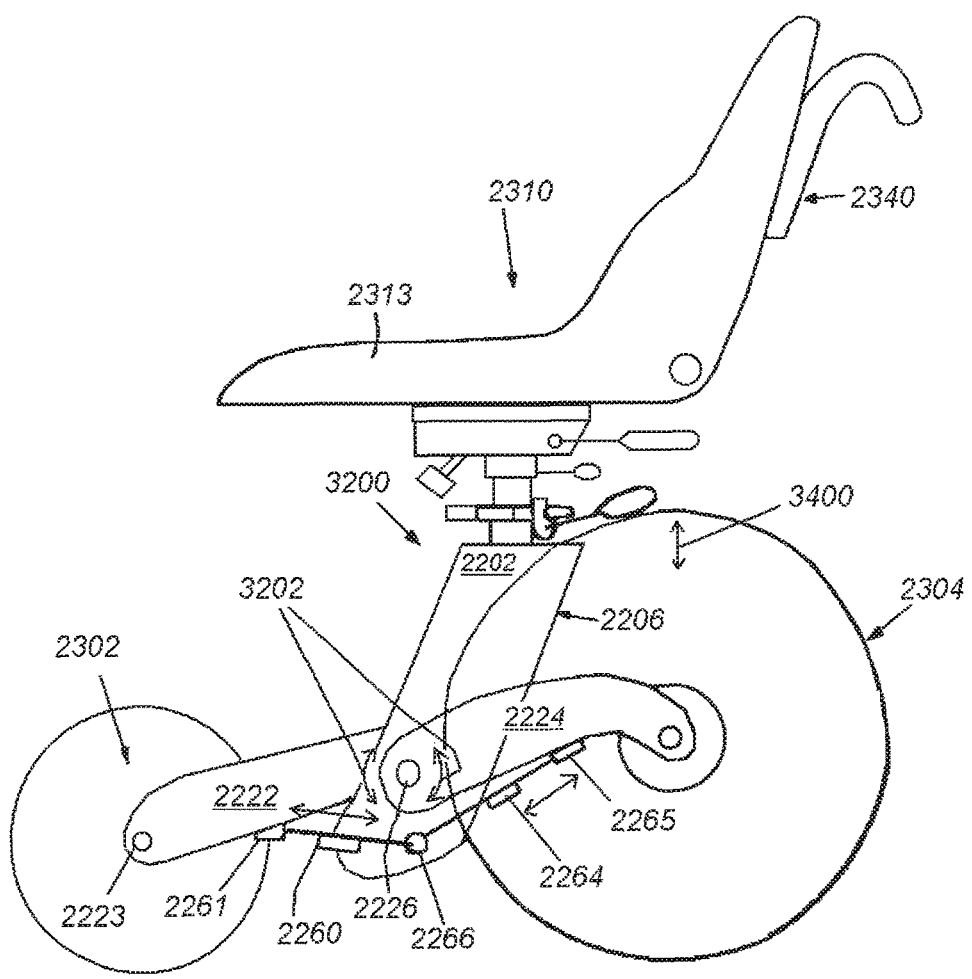
FIG. 32 is a side view of a wheelchair, according to the seventh embodiment.

FIG. 32 shows the dissipation of forces through the chassis assembly 2200. As noted above, commercially available wheelchairs include a seat fixed to the frame so as to define a fixed interdependent unit. In the commercially available wheelchairs, when impact force loads are transferred upwards through the frame, through the seat, they impact the occupant. This is because the seat is an integral part of the frame. In an embodiment, the illustrative wheelchair more effectively incorporates an independent four shock system (e.g., suspension arms with shock absorbers) and a chair that is not a stressed member of the chassis. When the illustrative wheelchair encounters and traverses any rough terrain such as thresholds or for that matter any irregularities, impacts are substantially reduced due to the suspension system based on multiple shock absorbers on the chassis and the chassis 2200 itself. Each suspension arm is independent and rotatable where it attaches to the chassis plate 2202 at the support portion 2206. The suspension arms 2222 and 2224 can rotate 3202 relative to axle 2226. The motion of each suspension arm is dampened by shock absorbers, which helps absorb the energy of the impact, as set forth above. This too allows the chair to essentially float over any irregularity that the chair is rolling over with very little of the impact force being transferred to the occupant. Any impact on one or several wheels will cause all the other wheels, arms, and shocks to react to counterbalance the impact(s) and reduce the energy of the impact.

In an embodiment, the chassis 2200 can flex upwards and downwards in a motion 3404. Furthermore, each side of the wheelchair has a separate support portion 2206 and axle 2226. This arrangement is different from commercially available wheelchairs, wherein a single axle passes from one side of the frame to the other and the rear wheels are thus locked relative to the frame. In contrast, the illustrative independent axles allow independent rotation of each suspension arm, thus, when a wheel encounters an impact from an irregular surface, its relevant suspension arm is allowed to rotate around the axle and the shock absorber softens the blow by absorbing the impact. While each shock absorber acts independently, the other suspension arms and shock absorbers reduce the impact by carrying the impact forces through the suspension system and not imparting it directly to the chassis as a stopping point. For example, if a front shock absorber extends or compresses due to an impact event, the opposing shock is allowed to remain static or compress or extend by rotating around the axle. This contains the force of the impact event within the lower shock and arm system and not transmitted to the occupant. Each mounting point for the shock absorbers and the axles can rotate and/or move independently of each other, resulting in a smoother ride compared to a commercially available wheelchair. For example, if a front wheel 2302 encounters a terrain feature, the relevant suspension arm attached to the wheel begins to move, dampened by the respective shock absorber, which moves relative to it mounting points. This causes the shock energy from the impact to be absorbed by the movement of the shock absorber and the movement of the suspension arms. Remaining energy can be absorbed by the movement of the chassis 2200. At each point, the impact energy is decreasing. The larger the impact, the more the suspension system engages and reacts at multiple various points. A single impact on a single suspension arm results in a reaction by only that suspension arm, whereas a larger object may cause all four arms to react with each reaction having less and less energy. The more energy absorbed by the suspension, the less energy is imparted to the chassis 2200, and, by removing the chair as a stressed member of the frame, very little energy from the impact is imparted to the occupant. Furthermore, the reaction of the suspension is relative to the amount of the impact, and avoids a back and forth motion (a "rocking horse" motion). This reduces the possibility of the chair tipping over sideways. The chair and its occupant assumes a level orientation in all directions, left, right, front, back and omnidirectionally. Variations in occupant weight and the terrain can be accommodated by adjusting the location of mounting points 2261 and 2265 along their relevant suspension arms and increasing or reducing the tension of each shock absorber.

FIG. 33 shows a tilting mechanism 3300 for a wheelchair, according to an embodiment. The tilting mechanism 3300 is an assembly that can include a tilting mechanism body 3302, a pivoting axle 3304 that is attached to the side of the chair 2313, and a locking device 3305 that is situated in a slot 3306 that can be locked and unlocked, to allow pivoting movement of the tilting mechanism. Movement of the tilting mechanism 3300 provides a tilting motion that can tilt the chair 2313 forwards and backwards. It is contemplated that a tilting mechanism can be included on one side of the chair, or on both sides. The tilting mechanism provides a system for adjusting the tilt of the seat for the occupant and contributes to the comfort of the occupant, as well as the ability for the caregiver to "tune" the ride by moving the center of gravity forwards or backwards, to adjust to different terrain and ground features.

FIGS. 34 and 35 describe various chairs that can be placed upon the chassis 2200. In FIG. 34, a seat with a mesh seat 3400 is depicted. The mesh can be a relatively tight mesh, or a more open mesh. A mesh seat can be desired for comfort, weight, or for ease of cleaning (for example, after an unanticipated personal leakage event by the occupant). While all seats described above are intended to be removable for cleaning and repair, as well as replacement with a different chair, the mesh chair advantageously can be rinsed off without having to remove it from the chassis. The exemplary mesh chair 3400 includes a seat mount 3401 for removable engagement with the chassis (not shown), a seat frame 3402, a back frame 3404, and a mesh fabric 3408 attached to the frame.

FIG. 35 shows an optional race car style seat 3500. A race car style seat 3500 includes a seat mount 3502 (not shown) and a padded seat having sides 3503 and a covering 3504 that is designed to resemble a race car seat and that may include logos, after the manner of professional race car seats.

Figure 36:
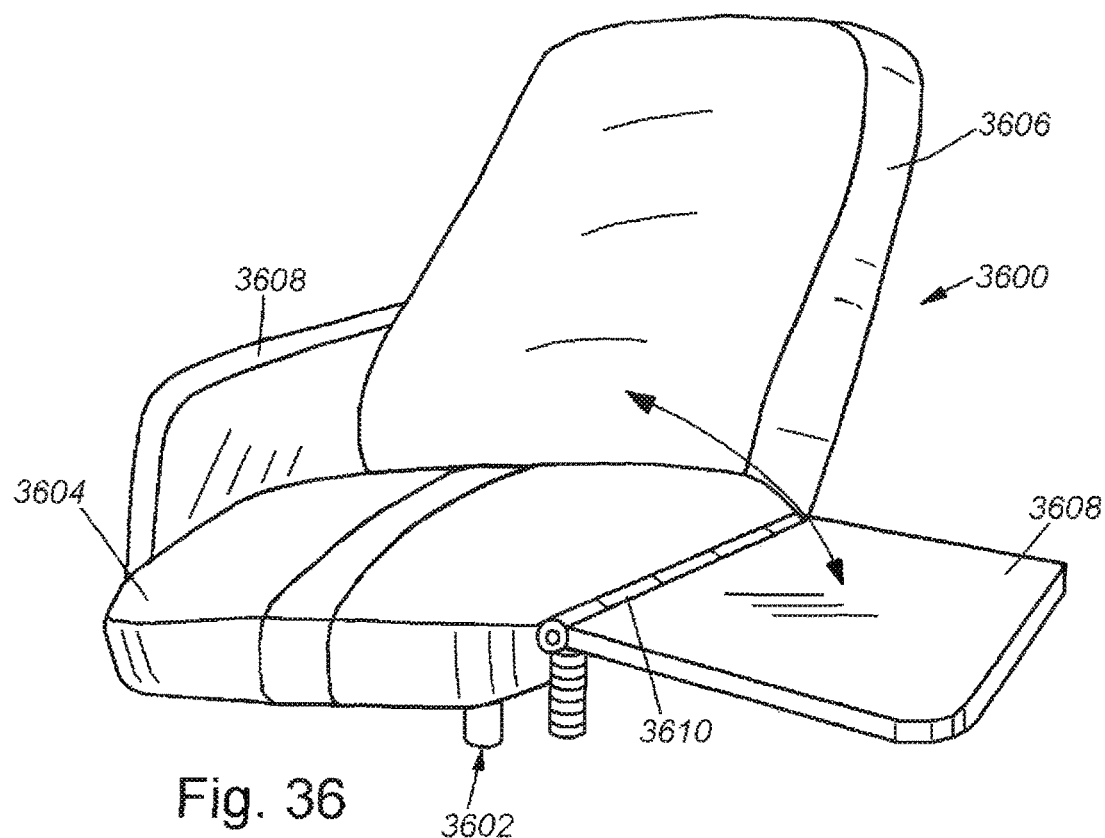
FIG. 36 is a view of a seat for a wheelchair with foldable transfer boards, according to an eleventh embodiment.

A seat with transfer boards is shown in FIG. 36. It is contemplated that certain of the occupants might not be readily removed from the wheelchair to another structure (for example, a bed or a medical examining table). The transfer board seat 3600 is an embodiment to facilitate movement of the occupant in and out of the seat. A transfer board seat 3600 includes a seat mount 3602 for engagement with a chassis (not shown), a seat 3604 and a seat back 3606. At least one transfer board 3608 is located at one side of the seat 3604. In an embodiment, the illustrative transfer board seat 3600 is provided with a transfer board 3608 on each side. The transfer board 3608 is attached to the seat 3604 by a hinge device 3610. In operation, the caregiver unlocks the transfer board and moves the board 3608 to a position that is co-planar with the seat 3604. The occupant can now be shifted across the transfer bed to another structure. Once the occupant has been transferred to another structure, the transfer board 3608 can be returned to its upright position. The ability to vertically raise and lower the seat allows the caregiver to align the seat and transfer board so that lateral movements from seat to another structure can be made without having to raise or lower the occupant by physically lifting.

Figure 37:
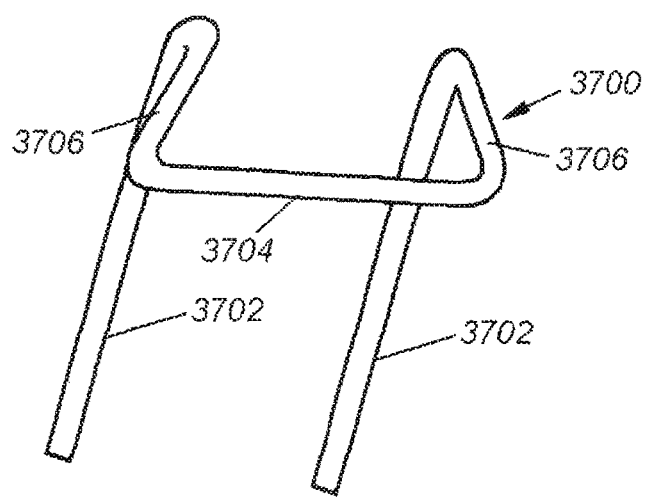
FIG. 37 is a view of a caregiver handle for a wheelchair, according to a twelfth embodiment.

The caregiver handles 3700 are shown in FIG. 37. In an embodiment, the handle 3700 is a tubular structure that is formed by bending and can be coated with a layer of comfort material (for example, a foam polymer). Each handle 3700 is provided with one or more attachment members 3702 for engagement with the wheelchair seat back (not shown). A horizontal cross bar 3704 provides a handle for grasping while providing motive force to the wheelchair. Segments 3706 provide a space between the cross bar 3704 and the back of the seat for the comfort of the caregiver's hands, as well as additional leverage for maneuvering the wheelchair. Segment 3706 can be used as an additional handle area. It is contemplated that the handle can be raised or lowered, or be provided with an angular adjustment to change the placement of the handle to match the ergometrics of the caregiver.

It should be clear to one of ordinary skill that the above described wheelchair and its variants provide a system based on an independent suspension for greater energy dissipation, comfort for the occupant and control for the caregiver. The above embodiments describe a wheelchair that overcomes the disadvantages of the prior art by providing a mobility system that had greater stability, ease of use and safety for both the occupant and caregiver. The increased adaptability of the chair for the caregiver can improve the caregiver's burden in moving the occupant, thereby improving the relationship between caregiver and occupant.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the wheels can be solid, foam filled or pneumatic. The springs can be springs that are a simple curve or provided with a complex curve, for example, a curve that describes an Euler spiral. The pillar mounted seat can be attached to a chassis assembly or to a main cross member. A spring tensioner can be provided for fine tuning the spring tension. The seat of the chair can be interchangeable with like chairs or chairs of a different design, shape and padding.

There are no limits to the type and functionality of chairs that can be fit to the chassis to satisfy ergonomic needs of the caregiver and user. It is not necessary to dispose of the entire wheelchair over time as the occupant's needs change; simply replace the seat or modify the chassis suspension as needs dictate. Also, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate space or system, such as the acting direction of gravity. Likewise, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5%). Accordingly, this description is meant to be taken only by way of example, and not to otherwise limit the scope of this invention.

What is claimed is:

1. A wheelchair comprising:
   a chair assembly;
   a chassis assembly comprising a chassis plate having a horizontal portion, a left support portion, and a right support portion; and
   a suspension assembly comprising:
      a left front suspension arm attached to the left support portion at a left suspension arm mounting point and attached to a left front wheel;
      a left front shock absorber attached to the left front suspension arm or the left front wheel and attached to a left shock absorber mounting point, wherein the left suspension arm mounting point is distinct from the left shock absorber mounting point;
      a left rear suspension arm attached to the left support portion at the left suspension arm mounting point and attached to a left rear wheel;
      a left rear shock absorber attached to the left rear suspension arm or a left rear wheel hub and attached to the left shock absorber mounting point.

2. The wheelchair as set forth in claim 1 wherein the chair assembly includes a seat and a seat base.

3. The wheelchair as set forth in claim 2 wherein the seat base is constructed and arranged to enable interchange of the seat in the chair assembly with another seat.

4. The wheelchair as set forth in claim 3 wherein the chair assembly includes a seat angle adjuster and a pillar.

5. The wheelchair as set forth in claim 1, further comprising at least one transfer board located at one side of a seat, wherein the transfer board is attached to the seat via a hinge and moves between a raised and lowered position.

6. The wheelchair as set forth in claim 1, wherein the left front wheel comprises a left front omnidirectional wheel.

7. The wheelchair as set forth in claim 1, further comprising:
a. a handle assembly; and
b. a rear brake assembly.

8. The wheelchair as set forth in claim 7, wherein the handle assembly comprises handlebars having at least two levers for controlling the rear brake assembly.

9. The wheelchair as set forth in claim 8, wherein the at least two levers control a left rear brake and a right rear brake independently.

10. The wheelchair as set forth in claim 7, the handle assembly further comprising:
a pair of attachment members attached to the chair assembly; and
a horizontal cross bar connected to the pair of attachment members by a pair of segments, respectively.

11. The wheelchair as set forth in claim 1, wherein the suspension assembly further comprises:
a right front suspension arm attached to the right support portion at a right suspension arm mounting point and attached to a right front wheel;
a right front shock absorber attached to the right front suspension arm or the right front wheel and attached to a right shock absorber mounting point, wherein the right suspension arm mounting point is distinct from the right shock absorber mounting point;
a right rear suspension arm attached to the right support portion at the right suspension arm mounting point and attached to a right rear wheel;
a right rear shock absorber attached to the right rear suspension arm or a right rear wheel hub and attached to the right shock absorber mounting point.

12. A wheelchair comprising:
a chair assembly;
a chassis assembly comprising a chassis plate having a horizontal portion, a left support portion, and a right support portion;
a suspension assembly comprising:
a left front suspension arm attached to the left support portion at a left suspension arm mounting point and attached to a left front wheel;
a left front shock absorber attached to the left front suspension arm or the left front wheel and attached to a left shock absorber mounting point, wherein the left suspension arm mounting point is distinct from the left shock absorber mounting point;
a left rear suspension arm attached to the left support portion at the left suspension arm mounting point and attached to a left rear wheel;
a left rear shock absorber attached to the left rear suspension arm or a left rear wheel hub and attached to the left shock absorber mounting point; and
a rear brake assembly comprising a left rear brake and a right rear brake; and
a handle assembly comprising handlebars, a first lever for controlling the left rear brake, and a second lever for controlling the right rear brake; and
a transfer board located at one side of a seat, wherein the transfer board is attached to the seat via a hinge and moves between a raised and lowered position.

13. A suspension assembly comprising:
a front suspension arm attached to a support portion at a suspension arm mounting point, and attached to a front wheel hub;
a front shock absorber attached to the front suspension arm at a front shock-arm mounting point, and attached to the support portion at a shock-support mounting point, wherein the suspension arm mounting point is distinct from the shock-support mounting point;
a rear suspension arm attached to the support portion at the suspension arm mounting point, and attached to a rear wheel hub;
a rear shock absorber attached to the rear suspension arm at a rear shock-arm mounting point, and attached to the support portion at the shock-support mounting point.

* * * * *